(12) United States Patent
Liang et al.

(10) Patent No.: US 12,676,839 B2
(45) Date of Patent: Jul. 7, 2026

(54) DIGITAL RIGHTS MANAGEMENT DRM METHOD, APPARATUS, AND SYSTEM

(71) Applicant: Huawei Technologies Co., Ltd., Shenzhen (CN)

(72) Inventors: Zhijian Liang, Beijing (CN); Di Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 460 days.

(21) Appl. No.: 17/896,363

(22) Filed: Aug. 26, 2022

(65) Prior Publication Data

US 2023/0006984 A1 Jan. 5, 2023

Related U.S. Application Data

(63) Continuation of application No. PCT/CN2020/077341, filed on Feb. 29, 2020.

(51) Int. Cl.
*H04L 9/40* (2022.01)
*G06F 21/10* (2013.01)
*G06F 21/60* (2013.01)

(52) U.S. Cl.
CPC ........ *H04L 63/0485* (2013.01); *G06F 21/105* (2013.01); *G06F 21/602* (2013.01); *G06F 21/1011* (2023.08)

(58) Field of Classification Search
CPC . H04L 63/0485; G06F 21/125; G06F 21/105; G06F 21/602; G06F 21/1011; G06F 2221/0704; G06F 2221/2107
See application file for complete search history.

(56) References Cited

U.S. PATENT DOCUMENTS 8,712,048 B2 * 4/2014 Nakayama ............ H04L 9/0836
726/32
2003/0088784 A1 5/2003 Ginter et al.
(Continued)

FOREIGN PATENT DOCUMENTS

CN 101110675 A 1/2008
CN 109117606 A 1/2019

OTHER PUBLICATIONS

Side-Channel Attacks and Countermeasures for Identity-Based Cryptographic Algorithm SM9 by Zhang et al., see https://onlinelibrary.wiley.com/doi/epdf/10.1155/2018/9701756 (Year: 2018).*
(Continued)

*Primary Examiner* — Jason K Gee
*Assistant Examiner* — Brian William Avery
(74) *Attorney, Agent, or Firm* — Slater Matsil, LLP

(57) ABSTRACT

Embodiments of this application provide a digital rights management DRM method, apparatus, and system, to implement a DRM interworking operation between DRM servers and clients of different vendors. The method includes: A DRM server encrypts a first media file by using a first encryption method to obtain a first encrypted media file; the DRM server generates content protection description information of the first encrypted media file, where the content protection description information includes a content identifier and encryption method information, the content identifier identifies the first encrypted media file, and the encryption method information identifies the first encryption method; the DRM server performs first formatting on the content protection description information to generate formatted content protection data; the DRM server encapsulates the formatted content protection data to generate a content protection data packet.

19 Claims, 4 Drawing Sheets

(56)　　　　　References Cited

U.S. PATENT DOCUMENTS

| 2004/0225890 | A1* | 11/2004 | Kang | H04L 9/0822 |
| | | | | 713/193 |
| 2007/0204078 | A1 | 8/2007 | Boccon-Gibod et al. | |
| 2012/0079578 | A1* | 3/2012 | Dachiraju | H04N 21/8549 |
| | | | | 726/26 |
| 2012/0246462 | A1 | 9/2012 | Moroney et al. | |
| 2012/0300788 | A1* | 11/2012 | Olshansky | H04L 12/2869 |
| | | | | 370/413 |
| 2014/0304297 | A1* | 10/2014 | Lian | G06F 16/148 |
| | | | | 707/769 |
| 2016/0094340 | A1* | 3/2016 | Wolrich | G06F 9/30038 |
| | | | | 713/189 |
| 2016/0254907 | A1* | 9/2016 | Messerman | H04L 9/16 |
| | | | | 380/279 |
| 2017/0357785 | A1 | 12/2017 | Kim et al. | |
| 2018/0054303 | A1* | 2/2018 | O'Toole | H04L 9/16 |
| 2018/0060544 | A1* | 3/2018 | Koo | G06F 21/602 |
| 2018/0091857 | A1* | 3/2018 | Valsecchi | H04N 21/2541 |
| 2019/0394024 | A1* | 12/2019 | Vepa | G06F 21/6209 |
| 2020/0104278 | A1* | 4/2020 | Kindig | H04N 21/4331 |
| 2021/0044850 | A1* | 2/2021 | Gala | G10K 11/1783 |
| 2021/0329319 | A1* | 10/2021 | Wu | H04N 21/8456 |

OTHER PUBLICATIONS

Pantos, "HTTP Live Streaming 2nd Edition," draft-pantos-hls-rfc8216bis-05, Sep. 23, 2019, 67 pages.
GY/T 277-2019, "Technical specification of digital rights management for video audio content distribution, "Jul. 5, 2019, 79 pages.
International Standard, "Information technology—MPEG systems technologies—" Part 7: Common encryption in ISO base media file format files, ISO/IEC 23001-7, Third edition, Feb. 15, 2016, 12 pages.
Pantos et al., "HTTP Live Streaming," Request for Comments: 8216, Aug. 2017, 60 pages.

* cited by examiner

100

DIGITAL RIGHTS MANAGEMENT DRM METHOD, APPARATUS, AND SYSTEM

CROSS-REFERENCE TO RELATED APPLICATIONS

This application is a continuation of International Application No. PCT/CN2020/077341, filed on Feb. 29, 2020, the disclosure of which is hereby incorporated by reference in its entirety.

TECHNICAL FIELD

This application relates to the field of digital rights management technologies, and in particular, to a digital rights management DRM method, apparatus, and system in the field of digital rights management technologies.

BACKGROUND

Digital rights management (DRM) refers to some technologies used by publishers to control use rights of protected objects. These technologies protect digital media content (for example, software, music, and movies) and hardware, and handle use restrictions of an instance of a digital product.

A DRM system may include a DRM server and a client. The DRM server can provide services such as encryption and authorization of digital media content for the client. When playing encrypted media content encrypted by the DRM server, the client needs to request the DRM server to grant permission to play the encrypted media content, obtain a key for decryption, and then properly decrypt the encrypted media content by using the key and play the media content.

However, because interfaces used for DRM interactions between DRM servers and clients of different vendors are incompatible, and formats of messages used for the DRM interactions are not uniform, a proper DRM interworking operation cannot be performed.

SUMMARY

Embodiments of this application provide a digital rights management DRM method, apparatus, and system, to implement a DRM interworking operation between DRM servers and clients of different vendors.

According to a first aspect, an embodiment of this application provides a digital rights management DRM method. The method includes: A DRM server encrypts a first media file by using a first encryption method to obtain a first encrypted media file; the DRM server generates content protection description information of the first encrypted media file, where the content protection description information includes a content identifier and encryption method information, the content identifier identifies the first encrypted media file, and the encryption method information identifies the first encryption method; the DRM server performs first formatting on the content protection description information to generate formatted content protection data; the DRM server encapsulates the formatted content protection data to generate a content protection data packet; and the DRM server packages the content protection data packet and the first encrypted media file, and sends to a client.

It should be noted that the DRM server described in this embodiment of this application refers to an apparatus that can provide a DRM service for the client. The DRM service includes services such as encryption and authorization of a (digital) media file.

It should be further noted that the DRM server may be deployed on a server. For example, the DRM server may be deployed on a cloud server.

According to the DRM method provided in this embodiment of this application, an entire-process solution based on content protection data packets in a uniform format is provided for the DRM server and the DRM client. The DRM server and the DRM client that use the solution can implement an accurate and effective interworking operation. Further, because the formatted content protection data in packaged data sent by the DRM server is obtained by performing the first formatting on content protection data, after receiving the packaged data, the client may parse the packaged data to obtain the formatted content protection data based on the first formatting. Therefore, the DRM server and the client can transmit data in a uniform format to perform a DRM interworking operation.

Optionally, the first media file may include a plurality of types. This is not limited in this embodiment of this application.

For example, the first media file may be in a moving picture experts group (MPEG) format, an MP4 (MPEG-4) format, or the like.

For another example, the first media file may be an audio file, a video file, or the like.

For another example, the first media file may be a streaming media file or a media fragment file in a streaming media file.

It should be noted that the streaming media file may include one media description file and a plurality of media segment files. The media description file describes a feature of the streaming media file, for example, a storage address, a playing sequence, playing time, and an obtaining manner of the plurality of media fragment files.

It should be noted that, in this embodiment of this application, an "encryption method" (for example, the first encryption method) is also referred to as an "encryption manner" or an "encrypted schema". The several terms have a same meaning. In other words, the several terms are interchangeable in embodiments of this application.

Optionally, the first encryption method may include a plurality of types of algorithms. This is not limited in this embodiment of this application.

In a possible implementation, the encryption method may be a state cryptography algorithm (a state cryptography algorithm designated by the State Cryptography Administration), for example, an SM4 state cryptography algorithm.

In another possible implementation, the encryption method may be an advanced encryption standard (AEC) algorithm, for example, an AEC cipher block chaining (AEC CBC) algorithm, and for another example, an AEC counter (AEC CTR) algorithm.

Optionally, before the DRM server encrypts the first media file by using the first encryption method to obtain the first encrypted media file, the DRM may determine a first key for encrypting the first encrypted media file and determine the first encryption method.

Optionally, after the DRM server encrypts the first media file by using the first encryption method to obtain the first encrypted media file, the DRM server may store a correspondence among the content identifier, the encryption method information, and key information of the first encrypted media file. The key information of the first encrypted media file includes the first key and a key identifier of the first key. The key identifier identifies the key. This facilitates subsequent authorization of a license request from a terminal.

Optionally, there may be one or more first keys. This is not limited in this embodiment of this application.

In a possible implementation, the DRM server may determine a quantity of the first keys based on different security level requirements.

In another possible implementation, the DRM server may determine a quantity of the first keys according to different encryption rules.

In still another possible implementation, when the first encrypted media file is a streaming media file, the first key may include a key of each streaming media fragment in the streaming media file.

Optionally, the first formatting may be a plurality of types of formatting. This is not limited in this embodiment of this application.

In a possible implementation, the first formatting may be javascript object notation JSON formatting.

In other words, the "formatted content protection data" and the "content protection data" include same content except that the "formatted content protection data" is content protection data in a JSON format.

It should be noted that, in this embodiment of this application, the "formatted content protection data" is also referred to as "protection system specific header data", namely, pssh data. The two terms have a same meaning. In other words, the two terms are interchangeable in this embodiment of this application.

In a possible implementation, the formatted content protection data includes a content identifier field and an encrypted schema field. The content identifier field is used to carry the content identifier. The encrypted schema field is used to carry the encryption method information.

In another possible implementation, the formatted content protection data further includes a version number field. The version number field indicates a version number of the formatted content protection data.

In still another possible implementation, the formatted content protection data includes the content identifier field, the encrypted schema field, the version number field, and at least one of an extension field, a key identifier field, or a current playing location index field. The extension field is used to carry extension data. The key identifier field indicates the identifier of the first key. The first key is a key for encrypting the first media file. The current playing location index field indicates a current playing location of the first encrypted media file.

It should be noted that the JSON format has concise and clear layers, facilitates data identification and parsing, and also facilitates extension. The JSON format is a data exchange language that is easy to read and write, and easy for a machine to parse and generate.

Therefore, the formatted data encryption description information obtained through the JSON formatting in this embodiment of this application also facilitates data identification and parsing, and facilitates extension. In addition, the JSON format is easy for a machine to parse and generate and therefore can improve data transmission efficiency.

It should be noted that the first formatting may alternatively be another formatting having a feature similar to that of the JSON format. This is not limited in this application.

Optionally, that the DRM server encapsulates the formatted content protection data to generate a content protection data packet may be understood as that the DRM server performs second formatting on the formatted content protection data to generate the content protection data packet.

It should be noted that, in this embodiment of this application, the "content protection data packet" is also referred to as a pssh box. The two terms have a same meaning. In other words, the two terms are interchangeable in this embodiment of this application.

Optionally, the DRM may encapsulate the formatted content protection data in a plurality of manners. This is not limited in this embodiment of this application.

In a possible implementation, the DRM may add a data packet header to the formatted content protection data to generate the content protection data packet.

In a possible implementation, the content protection data packet includes a formatted data field and a data size field. The formatted data field is used to carry the formatted content protection data. The data size field indicates a size of the formatted data field.

Optionally, the content protection data packet further includes at least one of a length field, a type field, a version field, a flag field, or a system identifier field. The length field indicates a length of the content protection data packet. The type field indicates a type of the content protection data packet. The version field indicates a version number of the content protection data packet. The flag field indicates a default value. The system identifier field indicates a standard used by the DRM server.

For example, the pssh box includes a protection system specific header and the pssh data.

Optionally, the DRM server may package the content protection data packet and the first encrypted media file and send to the client in a plurality of manners. This is not limited in this embodiment of this application.

In a first possible implementation, the DRM server adds the content protection data packet to a media description file of the first encrypted media file.

For example, the DRM server adds the content protection data packet to a media presentation description MPD file of the first encrypted media file when the first encrypted media file meets a dynamic adaptive streaming over HTTP DASH standard.

For another example, the DRM server adds the content protection data packet to an M3U8 file of the first encrypted media file when the first encrypted media file meets an HTTP live streaming HIS standard or a common media application format CMAF standard.

It should be noted that, in the DASH/HIS standard, the first encrypted media file may be a streaming media file or a media fragment file in a streaming media file. When the first encrypted media file is a media fragment file in a streaming media file, the media description file of the first encrypted media file may be understood as a media description file of the streaming media file to which the media fragment file belongs. When the first encrypted media file is a streaming media file, the first key may include a key of each media fragment file in the streaming media file and a key identifier of each streaming media fragment file.

In a second possible implementation, the DRM server adds the content protection data packet to an unencrypted field. The first encrypted media file includes the unencrypted field.

For example, the DRM server adds the content protection data packet to the unencrypted field of the first encrypted media file when a format of the first encrypted media file is a moving picture experts group MP4 or a fragmented moving picture experts group FMP4.

Optionally, the DRM server may determine, in a plurality of manners, the key information of the first encrypted media file based on the content protection data packet carried in a license request sent by the client and a pre-stored mapping relationship, and send a license to the client. The license is used to grant permission to play the first encrypted media file. The license carries the key information of the first encrypted media file.

In a first possible implementation, the DRM server may determine the key information of the first encrypted media file based on the content protection data packet and the pre-stored mapping relationship, where the key information includes the first key and the key identifier of the first key, the key identifier identifies the key, and the mapping relationship indicates the correspondence among the content identifier, the encryption method, and the key information; and send the license to the client, where the license is used to grant permission to play the first encrypted media file, and the license carries the key information of the first encrypted media file.

It should be noted that if the client requests an authorization license of an encrypted media file from the DRM server, the DRM server sends, to the client, only the authorization license of the encrypted media file requested by the client. In this way, security of DRM can be improved, and because the license has a small data size, authorization efficiency is high.

In a second possible implementation, when the formatted content protection data in the content protection data packet includes the content identifier and the encryption method information, the license may further carry key information of each of at least one encrypted media file that has the same content identifier and encryption method information as those of the first encrypted media file. The license is further used to grant permission to play the at least one encrypted media file.

It should be noted that if the client requests an authorization license of an encrypted media file from the DRM server, the DRM server sends, to the client, both of the authorization license of the encrypted media file requested by the client and an authorization license of the at least one encrypted media file that has the same content identifier and encryption information as those of the first encrypted media file, and the client controls use of the authorization license of the at least one encrypted media file.

For example, when the first encrypted media file is a media fragment file in a streaming media file, the at least one encrypted media file may be a streaming media fragment file that belongs to the same streaming media file as the first encrypted media file.

Therefore, when decrypting and playing the at least one encrypted media file, the client does not need to request an authorization license of another encrypted media file. This can improve authorization efficiency. In addition, if the at least one encrypted media file and the first encrypted media file have continuous playing locations, playing smoothness of the client can be further improved. In addition, time shift and playback functions of a media file are supported.

In a third possible implementation, when the formatted content protection data in the content protection data packet includes the current playing location index field, the license in the first possible implementation may further carry key information of each of at least one adjacent encrypted media file whose location is continuous with the current playing location of the first encrypted media file. The license is further used to grant permission to play the at least one adjacent encrypted media file.

It should be noted that if the client requests an authorization license of an encrypted media file from the DRM server, the DRM server sends, to the client, both of the authorization license of the encrypted media file requested by the client and an authorization license of the at least one adjacent encrypted media file whose location is continuous with the current playing location of the first encrypted media file, and the client controls use of an authorization license of another encrypted media file.

Therefore, when decrypting and playing the foregoing encrypted media files with the continuous playing locations, the client does not need to request the authorization license of the another encrypted media file. This can improve authorization efficiency and improve playing smoothness of the client. In addition, time shift and playback functions of a media file are supported.

According to the DRM method provided in this embodiment of this application, the first encryption method may be a state cryptography algorithm. In other words, the DRM server supports encryption by using the state cryptography algorithm. The terminal can correctly parse the content protection data packet to obtain the state cryptography algorithm.

In a possible implementation, the license request includes a first content protection data packet field. The content protection data packet field is used to carry the content protection data packet.

In a possible implementation, the license includes a key information field. The key information field is used to carry the key information of the first encrypted media file.

Optionally, the key information field is further used to carry key information of another encrypted media file authorized by the DRM server.

Optionally, the license request further includes a permission type information field. The permission type information field is used to carry permission type information. The permission type information indicates at least one of online playing permission or offline playing permission.

Optionally, the license further includes a permission type information field. The permission type information field is used to carry permission type information. The permission type information indicates at least one of online playing permission or offline playing permission.

According to the DRM method provided in this embodiment of this application, the permission type information field is extended in the license request and the license, so that offline playing can be authorized, and time shift and playback functions of offline playing are supported.

According to a second aspect, an embodiment of this application further provides a digital rights management DRM method. The method includes: A client receives packaged data sent by a DRM server, where the packaged data includes a content protection data packet and a first encrypted media file, formatted content protection data is encapsulated in the content protection data packet, the formatted content protection data is obtained by performing first formatting on content protection description information of the first encrypted media file, the content protection description information includes a content identifier and encryption method information, the content identifier identifies the first encrypted media file, and the encryption method information identifies a first encryption method for encrypting a first media file; the client obtains the content protection data packet from the packaged data; the client decrypts the first encrypted media file based on the content protection data packet to obtain the first media file; and the client plays the first media file.

It should be further noted that the client described in this embodiment of this application refers to an apparatus that supports a media playing function and a DRM function. The DRM function includes functions such as decryption and authorization of an encrypted (digital) media file.

It should be further noted that the client may be deployed in a terminal.

The terminal in this embodiment of this application may also be referred to as terminal equipment, user equipment, or the like. For example, the terminal may be a set-top box, a mobile phone, a tablet computer, a laptop computer, a personal digital assistant, a point of sales, a vehicle-mounted computer, a smart speaker, an augmented reality device, a virtual reality device, a wearable device, a vehicle-mounted terminal, a smart vehicle, or the like. This is not limited in this embodiment of this application.

According to the DRM method provided in this embodiment of this application, an entire-process solution based on content protection data packets in a uniform format is provided for the DRM server and the DRM client. The DRM server and the DRM client that use the solution can implement an accurate and effective interworking operation. Further, because the formatted content protection data in the packaged data sent by the DRM server is obtained by performing the first formatting on content protection data, after receiving the packaged data, the client may parse the packaged data to obtain the formatted content protection data based on the first formatting. Therefore, the DRM server and the client can transmit data in a uniform format to perform a DRM interworking operation.

It should be noted that, in this embodiment of this application, an "encryption method" (for example, the first encryption method) is also referred to as an "encryption manner" or an "encrypted schema". The several terms have a same meaning. In other words, the several terms are interchangeable in this embodiment of this application.

Optionally, the first encryption method may include a plurality of types of algorithms. This is not limited in this embodiment of this application.

In a possible implementation, the encryption method may be a state cryptography algorithm (a state cryptography algorithm designated by the State Cryptography Administration), for example, an SM4 state cryptography algorithm.

In another possible implementation, the encryption method may be an AEC algorithm, for example, an AEC CBC algorithm, and for another example, an AEC CTR algorithm.

Optionally, the first formatting may be a plurality of types of formatting. This is not limited in this embodiment of this application.

In a possible implementation, the first formatting may be javascript object notation JSON formatting.

In other words, the "formatted content protection data" and the "content protection data" include same content except that the "formatted content protection data" is content protection data in a JSON format.

It should be noted that, in this embodiment of this application, the "formatted content protection data" is also referred to as "protection system specific header data", namely, pssh data. The two terms have a same meaning. In other words, the two terms are interchangeable in this embodiment of this application.

In a possible implementation, the formatted content protection data includes a content identifier field and an encrypted schema field. The content identifier field is used to carry the content identifier. The encrypted schema field is used to carry the encryption method information.

In another possible implementation, the formatted content protection data further includes a version number field. The version number field indicates a version number of the formatted content protection data.

In still another possible implementation, the formatted content protection data includes the content identifier field, the encrypted schema field, the version number field, and at least one of an extension field, a key identifier field, or a current playing location index field. The extension field is used to carry extension data. The key identifier field indicates an identifier of a first key. The first key is a key for encrypting the first media file. The current playing location index field indicates a current playing location of the first encrypted media file.

It should be noted that the JSON format has concise and clear layers, facilitates data identification and parsing, and also facilitates extension. The JSON format is a data exchange language that is easy to read and write, and easy for a machine to parse and generate.

Therefore, the formatted data encryption description information obtained through the JSON formatting in this embodiment of this application also facilitates data identification and parsing, and facilitates extension. In addition, the JSON format is easy for a machine to parse and generate and therefore can improve data transmission efficiency.

It should be noted that the first formatting may alternatively be another formatting having a feature similar to that of the JSON format. This is not limited in this application.

In a possible implementation, the content protection data packet includes a formatted data field and a data size field. The formatted data field is used to carry the formatted content protection data. The data size field indicates a size of the formatted data field.

Optionally, the content protection data packet further includes at least one of a length field, a type field, a version field, a flag field, or a system identifier field. The length field indicates a length of the content protection data packet. The type field indicates a type of the content protection data packet. The version field indicates a version number of the content protection data packet. The flag field indicates a default value. The system identifier field indicates a standard used by the DRM server.

For example, a pssh box includes a protection system specific header and the pssh data.

Optionally, the client may obtain the content protection data packet from the packaged data in a plurality of manners. This is not limited in this embodiment of this application.

In a possible implementation, the client may obtain the content protection data packet from a description file of the first encrypted media file.

In another possible implementation, the client may obtain the content protection data packet from an unencrypted field. The first encrypted media file includes the unencrypted field.

Optionally, the client may decrypt, in a plurality of manners, the first encrypted media file based on the content protection data packet to obtain the first media file. This is not limited in this embodiment of this application.

In a first possible implementation, the client may send a license request to the DRM server, where the license request is used to request permission to play the first encrypted media file, and the license request message carries the content protection data packet; receive a license sent by the DRM server, and decrypt the first encrypted media file based on key information of the first encrypted media file to obtain the first media file.

It should be noted that if the client requests an authorization license of an encrypted media file from the DRM server, the DRM server sends, to the client, only the authorization license of the encrypted media file requested by the client. In this way, security of DRM can be improved, and because the license has a small data size, authorization efficiency is high.

In a second possible implementation, when the formatted content protection data in the content protection data packet includes the content identifier and the encryption method information, the license may further carry key information of each of at least one encrypted media file that has the same content identifier and encryption method information as those of the first encrypted media file. The license is further used to grant permission to play the at least one encrypted media file. The client may further decrypt each encrypted media file based on the key information of each of the at least one encrypted media file to obtain at least one media file, and play the at least one media file.

It should be noted that if the client requests an authorization license of an encrypted media file from the DRM server, the DRM server sends, to the client, both of the authorization license of the encrypted media file requested by the client and an authorization license of the at least one encrypted media file that has the same content identifier and encryption information as those of the first encrypted media file, and the client controls use of the authorization license of the at least one encrypted media file.

For example, when the first encrypted media file is a media fragment file in a streaming media file, the at least one encrypted media file may be a streaming media fragment file that belongs to the same streaming media file as the first encrypted media file.

Therefore, when decrypting and playing the at least one encrypted media file, the client does not need to request an authorization license of another encrypted media file. This can improve authorization efficiency. In addition, if the at least one encrypted media file and the first encrypted media file have continuous playing locations, playing smoothness of the client can be further improved. In addition, time shift and playback functions of a media file are supported.

In a third possible implementation, when the formatted content protection data in the content protection data packet includes the current playing location index field, the license in the first possible implementation may further carry key information of each of at least one adjacent encrypted media file whose location is continuous with the current playing location of the first encrypted media file. The license is further used to grant permission to play the at least one adjacent encrypted media file. The client may further decrypt each encrypted media file based on the key information of each of the at least one adjacent encrypted media file to obtain at least one adjacent media file, and play the at least one adjacent media file.

It should be noted that if the client requests an authorization license of an encrypted media file from the DRM server, the DRM server sends, to the client, both of the authorization license of the encrypted media file requested by the client and an authorization license of the at least one adjacent encrypted media file whose location is continuous with the current playing location of the first encrypted media file, and the client controls use of an authorization license of another encrypted media file.

Therefore, when decrypting and playing the foregoing encrypted media files with the continuous playing locations, the client does not need to request the authorization license of the another encrypted media file. This can improve authorization efficiency and improve playing smoothness of the client. In addition, time shift and playback functions of a media file are supported.

Optionally, that the client decrypts the first encrypted media file based on the key information of the first encrypted media file specifically includes: parsing the content protection data packet to obtain the formatted content protection data; obtaining the first encryption method from the formatted content protection data; and decrypting the first encrypted media file based on the key information of the first encrypted media file and the first encryption method to obtain the first media file.

According to the DRM method provided in this embodiment of this application, the first encryption method may be a state cryptography algorithm. In other words, the DRM server supports encryption by using the state cryptography algorithm. The terminal can correctly parse the content protection data packet to obtain the state cryptography algorithm.

In a possible implementation, the license request includes a first content protection data packet field. The content protection data packet field is used to carry the content protection data packet.

In a possible implementation, the license includes a key information field. The key information field is used to carry the key information of the first encrypted media file.

Optionally, the key information field is further used to carry key information of another encrypted media file authorized by the DRM server.

Optionally, the license request further includes a permission type information field. The permission type information field is used to carry permission type information. The permission type information indicates at least one of online playing permission or offline playing permission.

Optionally, the license further includes a permission type information field. The permission type information field is used to carry permission type information. The permission type information indicates at least one of online playing permission or offline playing permission.

It should be noted that the permission type information field is extended in the license request and the license, so that offline playing can be authorized, and time shift and playback functions of offline playing are supported.

According to a third aspect, an embodiment of this application further provides a digital rights management DRM apparatus. The apparatus includes a processor and a transceiver coupled to the processor. The processor is configured to encrypt a first media file by using a first encryption method to obtain a first encrypted media file; generate content protection description information of the first encrypted media file, where the content protection description information includes a content identifier and encryption method information, the content identifier identifies the first encrypted media file, and the encryption method information identifies the first encryption method; perform first formatting on the content protection description information to generate formatted content protection data; encapsulate the formatted content protection data to generate a content protection data packet; and package the content protection data packet and the first encrypted media file to generate packaged data. The transceiver is configured to send the packaged data to a client.

In a possible implementation, the first formatting is javascript object notation JSON formatting.

In a possible implementation, the formatted content protection data includes a content identifier field and an encrypted schema field. The content identifier field is used to carry the content identifier. The encrypted schema field is used to carry the encryption method information.

In a possible implementation, the formatted content protection data further includes a version number field and at least one of an extension field, a key identifier field, or a current playing location index field. The version number field indicates a version number of the formatted content protection data. The extension field is used to carry extension data. The key identifier field indicates an identifier of a first key. The first key is a key for encrypting the first media file. The current playing location index field indicates a current playing location of the first encrypted media file.

In a possible implementation, the content protection data packet includes a formatted data field and a data size field. The formatted data field is used to carry the formatted content protection data. The data size field indicates a size of the formatted data field.

In a possible implementation, the transceiver is further configured to receive a license request sent by the client. The license request is used to request permission to play the first encrypted media file. The license request carries the content protection data packet. The processor is further configured to determine key information of the first encrypted media file based on the content protection data packet and a pre-stored mapping relationship. The key information includes the first key and a key identifier of the first key. The key identifier identifies the key. The mapping relationship indicates a correspondence among the content identifier, the encryption method, and the key information. The transceiver is further configured to send a license to the client. The license is used to grant permission to play the first encrypted media file. The license carries the key information of the first encrypted media file.

In a possible implementation, when the formatted content protection data in the content protection data packet further includes the current playing location index field, and the current playing location index field indicates the current playing location of the first encrypted media file, the processor is further configured to: parse the content protection data packet to obtain the current playing location; and determine, based on the current playing location, key information of at least one adjacent encrypted media file whose location is continuous with the current playing location of the first encrypted media file, where the key information of the at least one adjacent encrypted media file includes a key of each of the at least one adjacent encrypted media file and a key identifier of each adjacent encrypted media file. The transceiver is further configured to send the license to the client. The license further carries key information of each of the at least one adjacent encrypted media file. The license is further used to grant permission to play the at least one adjacent encrypted media file.

In a possible implementation, the license request further includes a permission type information field. The permission type information field is used to carry permission type information. The permission type information indicates at least one of online playing permission or offline playing permission.

In a possible implementation, the processor is specifically configured to: add the content protection data packet to a media description file of the first encrypted media file; or add the content protection data packet to an unencrypted field, where the first encrypted media file includes the unencrypted field.

In a possible implementation, that a DRM server packages the content protection data packet and the first encrypted media file, and sends to the client includes: adding the content protection data packet to a media presentation description MPD file of the first encrypted media file when the first encrypted media file meets a dynamic adaptive streaming over HTTP DASH standard; adding the content protection data packet to an M3U8 file of the first encrypted media file when the first encrypted media file meets an HTTP live streaming HIS standard or a common media application format CMAF standard; or adding the content protection data packet to the unencrypted field of the first encrypted media file when a format of the first encrypted media file is a moving picture experts group MP4 or a fragmented moving picture experts group FMP4.

In a possible implementation, the first encryption method includes an SM state cryptography algorithm.

According to a DRM system provided in this embodiment of this application, by using an entire-process solution based on content protection data packets in a uniform format, the DRM server and the DRM client can implement an accurate and effective interworking operation. Further, because the formatted content protection data in the packaged data sent by the DRM server is obtained by performing the first formatting on content protection data, after receiving the packaged data, the client may parse the packaged data to obtain the formatted content protection data based on the first formatting. Therefore, the DRM server and the client can transmit data in a uniform format to perform a DRM interworking operation.

According to a fourth aspect, an embodiment of this application further provides a digital rights management DRM apparatus. The apparatus includes a processor and a transceiver coupled to the processor. The transceiver is configured to receive packaged data sent by a DRM server. The packaged data includes a content protection data packet and a first encrypted media file. Formatted content protection data is encapsulated in the content protection data packet. The formatted content protection data is obtained by performing first formatting on content protection description information of the first encrypted media file. The content protection description information includes a content identifier and encryption method information. The content identifier identifies the first encrypted media file. The encryption method information identifies a first encryption method for encrypting a first media file. The processor is configured to: obtain the content protection data packet from the packaged data; decrypt the first encrypted media file based on the content protection data packet to obtain the first media file; and play the first media file.

In a possible implementation, the first formatting is javascript object notation JSON formatting.

In a possible implementation, the formatted content protection data includes a content identifier field and an encrypted schema field. The content identifier field is used to carry the content identifier. The encrypted schema field is used to carry the encryption method information.

In a possible implementation, the formatted content protection data further includes a version number field and at least one of an extension field, a key identifier field, or a current playing location index field. The version number field indicates a version number of the formatted content protection data. The key identifier field indicates an identifier of a first key. The first key is a key for encrypting the first media file. The current playing location index field indicates a current playing location of the first encrypted media file.

In a possible implementation, the content protection data packet includes a formatted data field and a data size field.

The formatted data field is used to carry the formatted content protection data. The data size field indicates a size of the formatted data field.

In a possible implementation, the transceiver is further configured to: send a license request to the DRM server, where the license request is used to request permission to play the first encrypted media file, and the license request message carries the content protection data packet; and receive a license sent by the DRM server, where the license is used to grant permission to play the first encrypted media file, the license carries key information of the first encrypted media file, the key information includes the first key and the key identifier of the first key, and the key identifier identifies the key. The processor is further configured to decrypt the first encrypted media file based on the key information of the first encrypted media file to obtain the first media file.

In a possible implementation, when the formatted content protection data in the content protection data packet further includes the current playing location index field, and the current playing location index field indicates the current playing location of the first encrypted media file, the license further carries key information of at least one adjacent encrypted media file whose location is continuous with the current playing location of the first encrypted media file. The key information of the at least one adjacent encrypted media file includes a key of each of the at least one adjacent encrypted media file and a key identifier of each adjacent encrypted media file. The license is further used to grant permission to play the at least one adjacent encrypted media file. The processor is further configured to: decrypt each encrypted media file based on key information of each of the at least one adjacent encrypted media file to obtain at least one adjacent media file; and play the at least one adjacent media file.

In a possible implementation, the processor is specifically configured to: parse the content protection data packet to obtain the formatted content protection data; obtain the first encryption method from the formatted content protection data; and decrypt the first encrypted media file based on the key information of the first encrypted media file and the first encryption method to obtain the first media file.

In a possible implementation, the license request further includes a permission type information field. The permission type information field is used to carry permission type information. The permission type information indicates at least one of online playing permission or offline playing permission.

In a possible implementation, the processor is specifically configured to: obtain the content protection data packet from a media description file of the first encrypted media file; or obtain the content protection data packet from an unencrypted field, where the first encrypted media file includes the unencrypted field.

In a possible implementation, the processor is specifically configured to: obtain the content protection data packet from a media presentation description MPD file of the first encrypted media file when the first encrypted media file meets a dynamic adaptive streaming over HTTP DASH standard; obtain the content protection data packet from an M3U8 file of the first encrypted media file when the first encrypted media file meets an HTTP live streaming HIS standard or a common media application format CMAF standard; or obtain the content protection data packet from the unencrypted field of the first encrypted media file when a format of the first encrypted media file is a moving picture experts group MP4 or a fragmented moving picture experts group FMP4, where the first encrypted media file includes the unencrypted field.

In a possible implementation, the first encryption method includes an SM state cryptography algorithm.

According to a fifth aspect, an embodiment of this application further provides a DRM system. The DRM system includes a DRM server and a client. The DRM server includes an encryption service module, a key service module, and an authorization service module. The client includes a media playing module, a DRM processing module, a decryption module, and an authorization module.

It should be noted that the DRM processing module, the decryption module, and the authorization module in the client form a DRM module. The DRM module and the media playing module may be two independent apparatuses or integrated into one apparatus. This is not limited in this embodiment of this application.

It should be further noted that the foregoing apparatus may be understood as a virtual apparatus, and the foregoing integration may be logical integration.

For example, the media playing module and the DRM module are two independent applications.

For another example, the media playing module and the DRM module are different functional modules of one application.

It should be further noted that formatted content protection data may be understood as pssh data, and a content protection data packet may be understood as a pssh box.

The encryption service module is configured to determine a first encryption method for a first media file.

The key service module is configured to determine a first key for the first media file.

The encryption service module or the key service module is further configured to: encrypt the first media file by using the first encryption method to obtain a first encrypted media file; generate content protection description information of the first encrypted media file, where the content protection description information includes a content identifier and encryption method information, the content identifier identifies the first encrypted media file, and the encryption method information identifies the first encryption method; perform first formatting on the content protection description information to generate the formatted content protection data (the pssh data), namely, step (1); and encapsulate the formatted content protection data to generate the content protection data packet (the pssh box).

In a possible implementation, the formatted content protection data includes a version number field, a content identifier field, an encrypted schema field, and at least one of a key identifier field, a current playing location index field, or an extension field.

It should be noted that, regardless of whether the encryption service module or the key service module performs the foregoing steps to generate the pssh data and the pssh box, both the encryption service module and the key service module need to synchronize the pssh data and the pssh box that are obtained in the process of performing the foregoing steps.

The key service module is further configured to store the correspondence among the content identifier, the encryption method information, and key information of the first encrypted media file. The key information includes the first key and a key identifier of the first key. The key identifier identifies the key.

The encryption service module is further configured to: package the content protection data packet and the first encrypted media file to obtain packaged data, and send the packaged data to the media playing module of the client, namely, step (2).

The media playing module is configured to: receive the packaged data sent by the encryption service module, where the packaged data includes the content protection data packet and the first encrypted media file; obtain the content protection data packet from the packaged data; and send DRM information to the DRM processing module, where the DRM information includes the content protection data packet, namely, step (3).

In a possible implementation, the DRM information includes a DRM information field. The DRM information field is used to carry the content protection data packet.

The DRM processing module is configured to: receive the DRM information sent by the media playing module; and send the content protection data packet in the DRM information to the authorization module, namely, step (4).

The authorization module is configured to: receive the content protection data packet sent by the DRM processing module; and send a license request to the authorization service module in the server, where the license request is used to request permission to play the first encrypted media file, and the license request message carries the content protection data packet, namely, step (5).

The authorization service module is configured to: receive the license request sent by the authorization module; determine the key information of the first encrypted media file based on the content protection data packet and a pre-stored mapping relationship, where the mapping relationship indicates the correspondence among the content identifier, the encryption method, and the key information; and send a license to the authorization module in the client, where the license is used to grant permission to play the first encrypted media file, and the license carries the key information of the first encrypted media file, namely, step (7).

In a possible implementation, because the key service module stores the mapping relationship indicating the correspondence among the content identifier, the encryption method information, and the key information, the authorization service module is specifically configured to: obtain the mapping relationship from the key service module, namely, step (6); and determine the key information of the first encrypted media file based on the content protection data packet and the pre-stored mapping relationship.

Optionally, step (5) may be replaced with the following path: the authorization module-the DRM processing module-the media playing module-the authorization service module; and step (7) may be replaced with the following path: the authorization service module-the media playing module-the DRM processing module-the authorization module.

The media playing module is further configured to invoke a decryption interface of the DRM module, and send the first encrypted media file to the decryption module, namely, step (8).

Optionally, when the formatted content protection data includes the key identifier of the first encrypted media file, the media playing module is further configured to: parse the content protection data packet to obtain the formatted content protection data; obtain the key identifier of the first encrypted media file from the formatted content protection data; and invoke the decryption interface, and send the key identifier of the first encrypted media file to the decryption module.

Optionally, the media playing module is further configured to: parse the content protection data packet to obtain the formatted content protection data; obtain the first encryption method from the formatted content protection data; and send the encryption method information to the decryption module through the decryption interface.

The DRM processing module is further configured to: parse the content protection data packet in the DRM information to obtain the formatted content protection data; obtain the first encryption method from the formatted content protection data; and send the encryption method information to the decryption module, namely, step (9-1).

It should be noted that both the media playing module and the DRM processing module may parse the content protection data packet to obtain the encryption method information. However, in a conventional technology, the media playing module cannot correctly parse a state cryptography algorithm. When the encryption method of the first encrypted media file is the state cryptography algorithm, the media playing module cannot correctly parse the content protection data packet to obtain the state cryptography algorithm. Therefore, a priority of the encryption method information parsed by the DRM processing module may be set to be higher than that of the encryption method information parsed by the media playing module. In this way, the client can support the state cryptography algorithm.

The decryption module is configured to: receive the key identifier that is of the first encrypted media file and that is sent by the media playing module; request the key information of the first encrypted media file from the authorization module based on the key identifier; and receive the key information that is of the first encrypted media file and that is sent by the authorization module, namely, step (9-2).

It should be noted that when the license carries key information of a plurality of encrypted media files, the decryption module may request the key information of the plurality of encrypted media files from the authorization module at a time; or may request the key information of the plurality of encrypted media files from the authorization module in batches, for example, request one piece of key information when using one piece of key information.

The decryption module is further configured to: receive the first encrypted media file sent by the media playing module, step (8); receive the encryption method information sent by the DRM processing module or the media playing module, step (9-1); receive the key information of the first encrypted media file sent by the authorization module, step (9-2); decrypt the first encrypted media file based on the key of the first encrypted media file and the encryption method information to obtain the first media file; and send the first media file to the media playing module, step (10).

The media playing module is further configured to receive the first media file sent by the decryption module, and play the first media file.

It should be noted that for an implementation process of step (1) to step (9), refer to descriptions corresponding to each step in the foregoing aspects and the possible implementations of the aspects, where step (9) includes step (9-1) and step (9-2). To avoid repetition, details are not described herein again.

According to a sixth aspect, an embodiment of this application further provides a number classification apparatus. The apparatus includes units configured to perform the method in any one of the foregoing aspects or the possible implementations of the foregoing aspects.

According to a seventh aspect, an embodiment of this application further provides a chip apparatus, including a communication interface and a processor. The communication interface and the processor communicate with each other through an internal connection path. The processor is configured to implement the method in any one of the foregoing aspects or the possible implementations of the foregoing aspects.

According to an eighth aspect, an embodiment of this application further provides a computer-readable storage medium, configured to store a computer program. The computer program includes instructions used to implement the method in any one of the foregoing aspects or the possible implementations of the foregoing aspects.

According to a ninth aspect, an embodiment of this application further provides a computer program product. The computer program product includes instructions. When the instructions are run on a computer, the computer is enabled to implement the method in any one of the foregoing aspects or the possible implementations of the foregoing aspects.

DETAILED DESCRIPTION OF ILLUSTRATIVE EMBODIMENTS

The following describes technical solutions of this application with reference to accompanying drawings.

It should be noted that a DRM server described in embodiments of this application refers to an apparatus that can provide a DRM service for a client. The DRM service includes services such as encryption and authorization of a (digital) media file.

It should be further noted that the DRM server may be deployed on a server. For example, the DRM server may be deployed on a cloud server.

It should be further noted that the client described in embodiments of this application refers to an apparatus that supports a media playing function and a DRM function. The DRM function includes functions such as decryption and authorization of an encrypted (digital) media file.

It should be further noted that the client may be deployed in a terminal.

The terminal in embodiments of this application may also be referred to as terminal equipment, user equipment (UE), or the like. For example, the terminal may be a set-top box, a mobile phone, a tablet computer (pad), a laptop computer, a personal digital assistant (PDA), a point of sales (POS), a vehicle-mounted computer, a smart speaker, an augmented reality (AR) device, a virtual reality (VR) device, a wearable device, a vehicle-mounted terminal, a smart vehicle, or the like. This is not limited in embodiments of this application.

Figure 1:
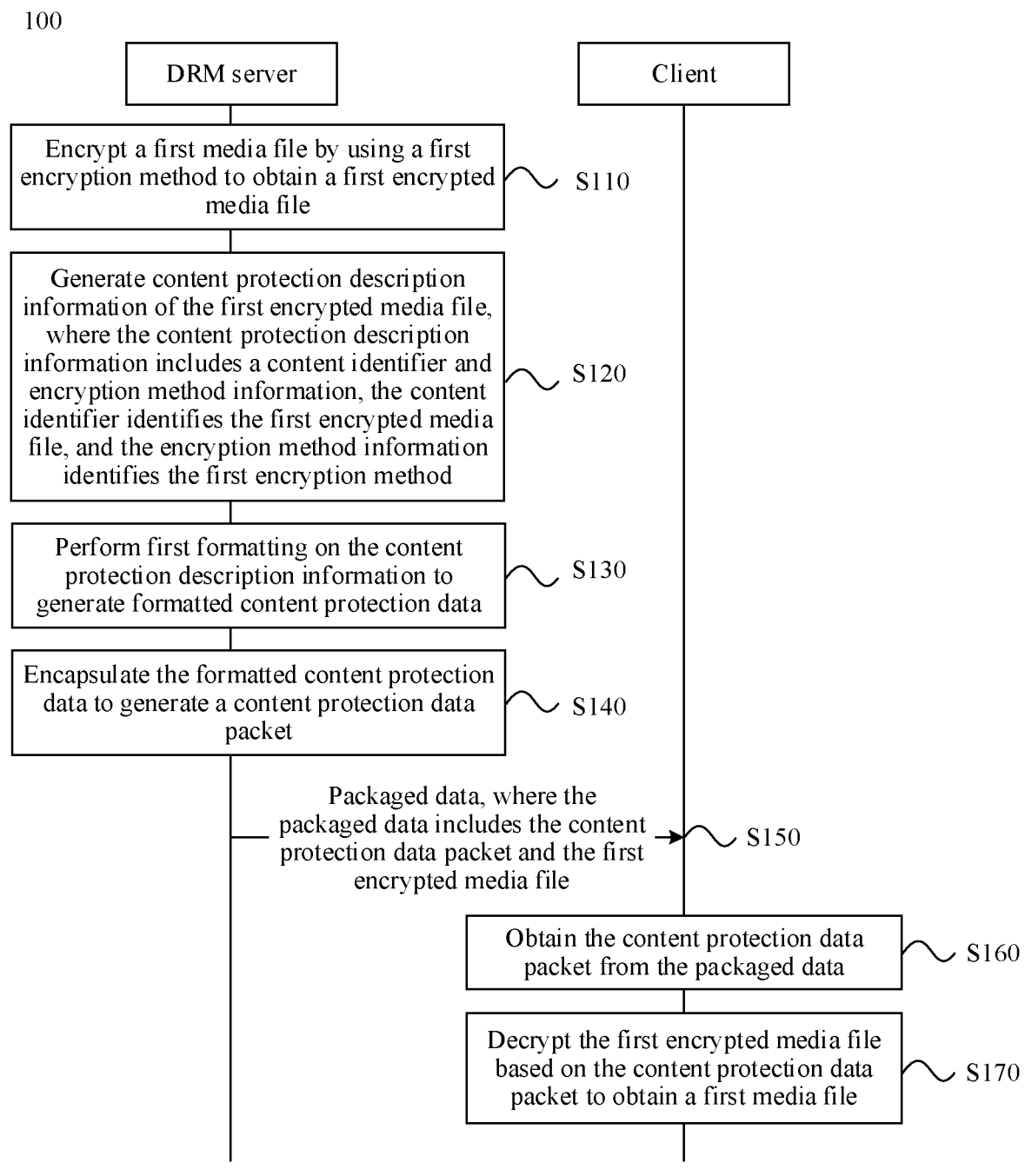
FIG. 1 is a schematic flowchart of a DRM method 100 according to an embodiment of this application.

FIG. 1 is a schematic flowchart of a DRM method 100 according to an embodiment of this application.

S110: A DRM server encrypts a first media file by using a first encryption method to obtain a first encrypted media file.

Optionally, the first media file may include a plurality of types. This is not limited in this embodiment of this application.

For example, the first media file may be in a moving picture experts group (MPEG) format, an MP4 (MPEG-4) format, or the like.

For another example, the first media file may be an audio file, a video file, or the like.

For another example, the first media file may be a streaming media file or a media fragment file in a streaming media file.

It should be noted that the streaming media file may include one media description file and a plurality of media segment files. The media description file describes a feature of the streaming media file, for example, a storage address, a playing sequence, playing time, and an obtaining manner of the plurality of media fragment files.

For example, in dynamic adaptive streaming over HTTP (DASH), a media presentation description (MPD) file is a media description file of DASH streaming media data.

For another example, in hyper text transfer protocol (HTTP) live streaming (HIS), an M3U8 file is a media description file of HIS streaming media data.

It should be noted that, in this embodiment of this application, an "encryption method" (for example, the first encryption method) is also referred to as an "encryption manner" or an "encrypted schema". The several terms have a same meaning. In other words, the several terms are interchangeable in this embodiment of this application.

Optionally, the first encryption method may include a plurality of types of algorithms. This is not limited in this embodiment of this application.

In a possible implementation, the encryption method may be a state cryptography algorithm (a state cryptography algorithm designated by the State Cryptography Administration), for example, an SM4 state cryptography algorithm.

In another possible implementation, the encryption method may be an advanced encryption standard (AEC) algorithm, for example, an AEC cipher block chaining (AEC CBC) algorithm, and for another example, an AEC counter (AEC CTR) algorithm.

Optionally, before S110, the DRM may determine a first key for encrypting the first encrypted media file and determine the first encryption method.

Optionally, after S110, the DRM server may store a correspondence among a content identifier, encryption method information, and key information of the first encrypted media file. The key information of the first encrypted media file includes the first key and a key identifier of the first key. The key identifier identifies the key. This facilitates subsequent authorization of a license request from a terminal.

Optionally, there may be one or more first keys. This is not limited in this embodiment of this application.

In a possible implementation, the DRM server may determine a quantity of the first keys based on different security level requirements.

In another possible implementation, the DRM server may determine a quantity of the first keys according to different encryption rules.

In still another possible implementation, when the first encrypted media file is a streaming media file, the first key may include a key of each streaming media fragment in the streaming media file.

S120: The DRM server generates content protection description information of the first encrypted media file, where the content protection description information includes the content identifier and the encryption method information, the content identifier identifies the first encrypted media file, and the encryption method information identifies the first encryption method.

S130: The DRM server performs first formatting on the content protection description information to generate formatted content protection data.

It should be noted that, in this embodiment of this application, the "formatted content protection data" is also referred to as "protection system specific header (PSSH) data", namely, pssh data. The two terms have a same meaning. In other words, the two terms are interchangeable in this embodiment of this application.

Optionally, the first formatting may be a plurality of types of formatting. This is not limited in this embodiment of this application.

In a possible implementation, the first formatting may be javascript object notation JSON formatting.

In other words, the "formatted content protection data" and "content protection data" include same content except that the "formatted content protection data" is content protection data in a JSON format.

It should be noted that the JSON format, namely, the javascript object notation (JSON) format, is a lightweight data exchange format. This format is based on a subset of a European Computer Manufacturers Association (ECMA) script (namely, js specifications formulated by the European Computer Manufacturers Association). JSON uses a text format that is entirely independent of programming languages to store and represent data. The JSON format has concise and clear layers, facilitates data identification and parsing also facilitates extension. The JSON format is a data exchange language that is easy to read and write, and easy for a machine to parse and generate.

Therefore, the formatted data encryption description information obtained through the JSON formatting in this embodiment of this application also facilitates data identification and parsing, and facilitates extension. In addition, the JSON format is easy for a machine to parse and generate and therefore can improve data transmission efficiency.

In a possible implementation, the formatted content protection data includes a content identifier field and an encrypted schema field. The content identifier field is used to carry the content identifier. The encrypted schema field is used to carry the encryption method information.

In another possible implementation, the formatted content protection data further includes a version number field. The version number field indicates a version number of the formatted content protection data.

In still another possible implementation, the formatted content protection data includes the content identifier field, the encrypted schema field, the version number field, and at least one of an extension field, a key identifier field, or a current playing location index field. The extension field is used to carry extension data. The key identifier field indicates the identifier of the first key. The first key is a key for encrypting the first media file. The current playing location index field indicates a current playing location of the first encrypted media file.

For example, a definition of pssh data in the JSON format is described in the following Table 1. The JSON format describes data in a manner of a JSON key/value.

TABLE 1

| Parameter | JSON key | Value type | Description |
|---|---|---|---|
| Version | version | String (String) | Mandatory |
| ContentID | contentID | String | Mandatory |
| Kids | kids | String array | Optional |
| EnSchema | enschema | String | Mandatory |
| PlayIndex | playIndex | String | Optional |
| Extensions | Exts | String | Optional |

Parameter fields in Table 1 are described as follows:

(1) A Version field is a version number field and indicates a version number of the pssh data. For example, a current version is V1.0 by default. It should be understood that the pssh data of different versions has the same format except that data carried by each field is different.

(2) A ContentID field is a content identifier field, indicates a content identifier of an encrypted media file, and is encoded using Base64.

It should be noted that Base64 encoding refers to an algorithm for encoding any byte of data based on 64 printable American Standard Code for Information Interchange (ASCII) characters.

(3) A Kids field is a key identifier field, is used to carry a key identifier array of the encrypted media file, and is encoded using Base64.

(4) An EnSchema field indicates an encrypted schema field, and is used to carry an encrypted schema of the encrypted media file, for example, "sm4c", "sm4s", "cenc", "cens", "cbc1", and "cbcs".

It should be noted that sm4c represents SM4-CBC sample encryption, sm4s represents SM4-CBC subsample encryption, cenc represents AES-CTR sample encryption, cens represents AES-CTR subsample encryption, cbc1 represents AES-CBC sample encryption, and cbcs represents AES-CBC subsample encryption.

It should be noted that, in this embodiment of this application, the "encrypted schema" is also referred to as the "encryption method". The two terms have a same meaning. In other words, the two terms are interchangeable in this embodiment of this application.

(5) A PlayIndex field is used to carry an index of the current playing location. The value is an unsigned integer.

(6) An Extensions field is used to carry extended information.

In a possible implementation, an example of the pssh data format is as follows:

```
{
"version": "V1.0",
"contentID": "base64_string",
"kids": ["base64_string", "base64_string", . . . ],
"enschema": "string",
"playIndex": "string",
"exts": "string"
}
```

An example of the pssh data is as follows:

{"version": "V1.0", "contentID": "MTAwMDAxMDEyMzQ1Njc4OQ==", "kids": ["NzZIN-zRiNzcoZDAxNDRiMWIxODNmNT goMDE4ZmQ3MTk="], "enschema": "cenc" }

It should be noted that the first formatting may alternatively be another formatting having a feature similar to that of the JSON format. This is not limited in this application.

S140: The DRM server encapsulates the formatted content protection data to generate a content protection data packet.

In other words, the DRM server performs second formatting on the formatted content protection data to generate the content protection data packet.

It should be noted that, in this embodiment of this application, the "content protection data packet" is also referred to as a pssh box. The two terms have a same meaning. In other words, the two terms are interchangeable in this embodiment of this application.

Optionally, the DRM may encapsulate the formatted content protection data in a plurality of manners. This is not limited in this embodiment of this application.

In a possible implementation, the DRM may add a data packet header to the formatted content protection data to generate the content protection data packet.

In a possible implementation, the content protection data packet includes a formatted data field and a data size field. The formatted data field is used to carry the formatted content protection data. The data size field indicates a size of the formatted data field.

Optionally, the content protection data packet further includes at least one of a length field, a type field, a version field, a flag field, or a system identifier field. The length field indicates a length of the content protection data packet. The type field indicates a type of the content protection data packet. The version field indicates a version number of the content protection data packet. The flag field indicates a default value. The system identifier field indicates a standard used by the DRM server.

It should be noted that the pssh box includes a protection system specific header and the pssh data.

For example, the pssh box includes key information required by a content protection system to play content of a media file. According to the ISO/IEC 23001-7:2016 CENC standard [2], a definition of the pssh box is described in the following Table 2.

TABLE 2

| Parameter | Quantity of bits | Type | Description |
|---|---|---|---|
| Size | 32 | Unsigned integer (Uimsbf) | Variable |
| Type | 32 | Uimsbf | 0x70 73 73 68 |
| Version | 8 | Uimsbf | 0x00 |
| Flags | 24 | Uimsbf | 0x00 00 00 |
| SystemID | 128 | Uimsbf | 0x3d5e6d359b9a41e 8b843dd3c6e72c42c |
| DataSize | 32 | Uimsbf | Variable |
| Data | DataSize*8 | Uimsbf | Variable |

Parameter fields in Table 2 are described as follows:

(1) A Size field is a length field, indicates a length of the entire pssh box, and includes a length of the Size field.

(2) A Type field is a type field, and indicates a type, namely, a 'pssh' (a protection system specific header), of the pssh box.

(3) A Version field is a version field, and indicates a version number of the pssh box.

(4) A Flags field has a fixed value, for example, 0.

(5) A SystemId field is a system identifier field, and identifies a solution or a standard used by the DRM server, for example, a universally unique identifier (UUID) for China digital rights management (ChinaDRM).

(6) A DataSize field is a data length field, and indicates a length of a Data field (unit: byte).

(7) A Data field is a formatted data field, and is used to carry pssh data in a JSON format.

An example of the pssh box is as follows:
000000a370737368000000003d5e6d359b9a41e8b84-

3dd3c6e72c42c000000837b
2276657273696f6e223a2256312e30222c22636f6e746-
56e744944223a224d5441774d4441784d4
445794d7a51314e6a63344f513d3d222c226b69647322
3a5b224e7a5a6c4e7a52694e7a63305a44
41784e4452694d5749784f444e6d4e5467304d44453-
45a6d51334d546b3d225d2c22656e736368
656d61223a2263656e63227d

It should be noted that the foregoing pssh box is exemplified based on a sequence of the parameters in Table 2 and a quantity of bits of each parameter. The 4-byte Size field carries "000000a3". The 4-byte Type field carries "70737368". The 1-byte Version field carries "00". The 3-byte Flags field carries "000000". The 16-byte SystemID field carries "3d5e6d359b9a41e8b843dd3c6e72c42c". The 4-byte DataSize field carries "00000083". The Data field carries "7b22766572736f6e223a2256312e30222c2263-6f6e74656e74494
4223a224d5441774d4441784d4445794d7a51314-
e6a63344f513d3d222c226b696473223a5b224e
7a5a6c4e7a52694e7a63305a4441784e4452694d-
5749784f444e6d4e5467304d4445345a6d5133
4d546b3d225d2c22656e736368656d61223a2263-
656e63227d".

The foregoing example is encoded using Base64. An example of the encoded pssh box is as follows:
AAAA03Bzc2gAAAAAPV5tNZuaQei4Q908bnL-
ELAAAAIN7InZlcnNpb24iOiJWMS4
wIiwiY29udGVudElEIjoiTVRBdo1EQXhNREV5T-
XpRMU5qYzRPUTo9Iiwia2lkcyI6WyJOelpsT
npSaU56YzBaREF4TkRSaU1XSXhPRE5tT1RnM-
E1ERTRabVEzTVRrPSJdLCJlbnNjaGVtYSI6I mNlbm-
MifQ==

S150: The DRM server packages the content protection data packet and the first encrypted media file and sends to a client; and correspondingly, the client receives packaged data sent by the DRM server, where the packaged data includes the content protection data packet and the first encrypted media file.

Optionally, the DRM server may package the content protection data packet and the first encrypted media file and send to the client in a plurality of manners. This is not limited in this embodiment of this application.

In a possible implementation, the DRM server may add the content protection data packet to a description file of the first encrypted media file.

In another possible implementation, the DRM server may add the content protection data packet to an unencrypted field, where the first encrypted media file includes the unencrypted field.

The following describes, by using an example, that the first encrypted media file complies with a definition of a pssh box in a common encryption in International Organization for Standardization (ISO) base media format files (CENC) format, a DASH format, an HIS protocol format, and a common media application format (CMAF).

In a first possible implementation, when the first encrypted media file is in an MP4 or FMP4 format, the first encrypted media file meets a CENC standard. The first encrypted media file includes an unencrypted field. The unencrypted field includes a pssh field. The pssh field is used to carry the pssh box.

For example, according to the ISO 23001-7:2016 CENC standard and the ChinaDRM standard, definitions of some unencrypted fields of the first encrypted media file are as follows:

(1) In the protection system specific header ('pssh') box, the 16-byte SystemID field is set to 0x3d5e6d359b9a41e8b843dd3c6e72c42c.

(2) A format of 'pssh' is the pssh box defined in Table 2.

(3) A default_IsEncrypted field in TrackEncryptionBox ('tenc') or an IsEncrypted field in SampleGroup-Description-Box ('sgpd') is defined as follows: oxo indicates that the media file is not encrypted, 0x1 indicates that the media file is encrypted, and 0x000002-0xFFFFFF are reserved. It should be understood that the default_IsEncrypted field and the IsEncrypted field are unencrypted fields in an encrypted media file, and the two fields indicate whether the encrypted media file is encrypted.

(4) For different encrypted schemas, a definition of a scheme type scheme_type character string in a scheme type box ('schm') in a protection mode information box ('sinf') is described in Table 3.

TABLE 3

| Encrypted schema | scheme_type |
|---|---|
| SM4-CBC sample encryption | sm4c |
| SM4-CBC subsample encryption | sm4s |
| AES-CTR sample encryption | cenc |
| AES-CTR subsample encryption | cens |
| AES-CBC sample encryption | cbc1 |
| AES-CBC subsample encryption | cbcs |

In a second possible implementation, when the first encrypted media file meets the DASH standard, the media description file of the first encrypted media file is an MPD file for describing a transmission feature of a plurality of media fragment files included in the first encrypted media file. The MPD file includes a ContentProtection field. The ContentProtection field includes a cenc:pssh field. The cenc:pssh field is used to carry a pssh box obtained through Base64 encoding.

For example, the ISO/IEC 23001-7[2] standard defines ISO/IEC 23009-1 DASH[3] support, to support a content protection (ContentProtection) function. According to the standard, a definition of ContentProtection is as follows:

(1) A value attribute (namely, a value attribute) field in ContentProtection carries the scheme type character string defined in Table 3. When a schemeIdUri (namely, a uniform resource identifier) field carries "urn:mpeg:dash:mp4protection:2011", correspondingly, a cenc:default_KID (namely, a key identifier) field carries an identifier KID of a key for encrypting a media file, and a character string in a UUID format is used, where cenc:default_KID is optional.

For example, the following is an example of ContentProtection:

<ContentProtection value="cenc"
schemeIdUri="urn:mpeg:dash:mp4protection:2011"
cenc:default_KID="76e74b77-4d01-44b1-b183-f584018fd719"/>

(2) When a schemeIdUri attribute field in ContentProtection carries "3d5e6d35-9b9a-41e8-b843-dd3c6e72c42c", correspondingly, the cenc:pssh field carries the character string that is defined in Table 2 and that is obtained after Base64 encoding is performed on the pssh box.

For example, the following is an example of ContentProtection:

<ContentProtection schemeIdUri="urn:uuid:3d5e6d35-9b9a-41e8-b843-dd3c6e72c42c">
<cenc:pssh>AAAA03Bzc2gAAAAAPV5tNZuaQei4Q9-08bnLELAAAAIN7InZ1cnNpb24iOiJWMS4wIiwiY29udGVudElEIjoiTVRBBd01EQXhNRE-V5TXpRMU5qYzRPUT09Iiwia2lkcyI6WyJOelps TnpSaU56YzBaREF4TkRSaU1XSXhPRE5tLR-nME1ERTRabVEzTVRrPSJdLCJlbnNjaGVtYSI6ImNlbmMMifQ==</cenc:pssh></ContentProtection>

It should be noted that, in the DASH standard, the first encrypted media file may be a streaming media file or a media fragment file in a streaming media file. When the first encrypted media file is a media fragment file in a streaming media file, the media description file of the first encrypted media file may be understood as a media description file of the streaming media file to which the media fragment file belongs. When the first encrypted media file is a streaming media file, the first key may include a key of each media fragment file in the streaming media file and a key identifier of the key of each streaming media fragment file.

In a third possible implementation, when the first encrypted media file meets the HTTP live streaming HIS standard or the common media application format CMAF standard, the media description file of the first encrypted media file is an M3U8 file for describing a transmission feature of a plurality of media fragment files included in the first encrypted media file. The M3U8 file includes a #EXT-X-KEY field. The #EXT-X-KEY field includes a URI field. The URI field is used to carry a pssh box obtained through Base64 encoding.

It should be noted that encryption key information of an encrypted media fragment in HLS[3] m3u8 is specified based on *EXT-X-KEY. Apple extends CMAF[4] and HLS [5] to support fMP4 fragment encryption in a cbcs scheme in the CENC standard. In an m3u8 file corresponding to audio and video, the encryption key information of the encrypted media fragment is specified based on EXT-X-KEY. The encrypted schemas in two HIS protocols, namely, HIS+TS and CMAF (CENC standard+fMP4), are supported.

For example, a definition of a *EXT-X-KEY format is described in Table 4. An attribute list of #*EXT-X-KEY, namely, attributes in <attribute-list>, include: a method (METHOD), a uniform resource identifier (uniform resource identifier, URI), a key identifier (KEYID), an initialization vector (initialization vector, MV, and a key format (KEY-FORMAT).

TABLE 4

| Attribute | Description | Definition |
|---|---|---|
| METHOD | Media encryption methods: NONE, SM4-CBC, SAMPLE-SM4, SAMPLE-AES, SAMPLE-AES-CTR, AES-CBC, and AES-CTR | Mandatory field. A correspondence to the scheme type character string defined in Table 3 and meanings are as follows: NONE: unencrypted; SM4-CBC: sm4c; SAMPLE-SM4: sm4s; SAMPLE-AES: cbcs; |

TABLE 4-continued

| Attribute | Description | Definition |
|---|---|---|
| | | SAMPLE-AES-CTR: cens; AES-CBC: cbc1; and AES-CTR: cenc. |
| URI | URI character string for obtaining a license, in a format of "data:text/plain; base64, [character string obtained after the pssh box data is encoded using Base64]" | Mandatory when METHOD is not NONE |
| KEYID | Key identifier, in a format of a hexadecimal string. | Optional |
| IV | Encrypted initialization vector, in a format of a hexadecimal string. | Optional |
| KEYFORMAT | Key format. If a bitstream format is CMAF (CENC standard + fMP4), a value is ChinaDRM UUID, namely, "urn:uuid:3d5e6d35-9b9a-41e8-b843-dd3c6e72c42c". If the bitstream format is HLS + TS, the value is "ChinaDRM version/ChinaDRM solution provider/Extended information" that are distinguished by slashes (/), for example, "ChinaDRM V2.0/CompanyName/Extended Information". | Mandatory when METHOD is not NONE |

An example of EXT-X-KEY is as follows:
EXT-X-KEY:MEMHOD=AES-CTR, URI="data:text/plain;base64, AAAA03Bzc2g AAAAAPV5tNZuaQei4Q908bnLELAAAAIN7InZ-IlcnNpb24iOiJWMS4wIiwiY29udGVudEIEI joiTVRBdoiEQXhNREV5TXpRMU5QYzRPUT-o9Iiwia2lkcyI6WyJOelpsTnpSaU56YzBaREF4Tk RSaUiXSXhPRE5tT1RnMEiERTRabVEzTVRr-PSTdLCJlbnNjaGVtYYSI6ImNlbmMifQ==", KEYID=0x76e74b774d0144b1b183f584018fd719, IV=0x6c336974753062747679 6a7679366d6c6c6c6c6c6c6c6c6c6c6c6c6c6c6c, KEYFO RMAT="urn:uuid:3d5e6d35-ga-4ie8-b843-dd3c6e72c42c"

It should be noted that, in the HIS/CMAF standard, the first encrypted media file may be a streaming media file or a media fragment file in a streaming media file. When the first encrypted media file is a media fragment file in a streaming media file, the media description file of the first encrypted media file may be understood as a media description file of the streaming media file to which the media fragment file belongs. When the first encrypted media file is a streaming media file, the first key may include a key of each media fragment file in the streaming media file and a key identifier of the key of each streaming media fragment file.

S160: The client obtains the content protection data packet from the packaged data.

Optionally, the client may obtain the content protection data packet from the packaged data in a plurality of manners. This is not limited in this embodiment of this application.

In a possible implementation, the client may obtain the content protection data packet from the description file of the first encrypted media file.

In another possible implementation, the client may obtain the content protection data packet from the unencrypted field. The first encrypted media file includes the unencrypted field.

S170: The client decrypts the first encrypted media file based on the content protection data packet to obtain the first media file.

Optionally, the client may decrypt, in a plurality of manners, the first encrypted media file based on the content protection data packet to obtain the first media file. This is not limited in this embodiment of this application.

In a first possible implementation, the client may send a license request to the DRM server. The license request is used to request permission to play the first encrypted media file. The license request message carries the content protection data packet.

Correspondingly, the DRM server determines the key information of the first encrypted media file based on the content protection data packet and the pre-stored mapping relationship, where the key information includes the first key and the key identifier of the first key, the key identifier identifies the key, and the mapping relationship indicates the correspondence among the content identifier, the encryption method, and the key information; and send a license to the client, where the license is used to grant permission to play the first encrypted media file, and the license carries the key information of the first encrypted media file.

Correspondingly, the client receives the license sent by the DRM server, and decrypts the first encrypted media file based on the key information of the first encrypted media file to obtain the first media file.

It should be noted that if the client requests an authorization license of an encrypted media file from the DRM server, the DRM server sends, to the client, only the authorization license of the encrypted media file requested by the client. In this way, security of DRM can be improved, and because the license has a small data size, authorization efficiency is high.

It should be noted that, in the foregoing first possible implementation, if the DRM server uses a same key (namely, the first key) to encrypt each of at least one media file (including the first media file) belonging to the content identifier by using the first encryption method, the mapping relationship pre-stored in the DRM server includes the correspondence among the content identifier, the encryption method information, and the key information of the first encrypted media file. In this case, the formatted content protection data in the content protection data packet includes the content identifier and the encryption method information.

Correspondingly, the DRM server determines the key information of the first encrypted media file based on the mapping relationship, the content identifier, and the encryption method information.

It should be further noted that, in the foregoing first possible implementation, if the DRM server uses different keys (the first media file is encrypted by using the first key) to encrypt each of a plurality of media files (including the first media file) belonging to the content identifier by using the first encryption method, the mapping relationship pre-stored in the DRM server includes a correspondence among the content identifier, the encryption method information, and key information of each of a plurality of encrypted media files. The key information of each encrypted media file includes a key of each encrypted media file and a key identifier of each encrypted media file. In this case, the formatted content protection data in the content protection data packet includes the content identifier, the encryption method information, and at least one of the identifier or a current playing location index of the first key.

Correspondingly, the DRM server determines the key information of the first encrypted media file based on the mapping relationship, the content identifier, the encryption method information, and at least one of the identifier or the current playing location index of the first key.

In a second possible implementation, when the formatted content protection data in the content protection data packet includes the content identifier and the encryption method information, the license may further carry key information of each of at least one encrypted media file that has the same content identifier and encryption method information as those of the first encrypted media file. The license is further used to grant permission to play the at least one encrypted media file.

Correspondingly, the client may further decrypt each encrypted media file based on the key information of each of the at least one encrypted media file to obtain at least one media file, and play the at least one media file.

It should be noted that if the client requests an authorization license of an encrypted media file from the DRM server, the DRM server sends, to the client, both of the authorization license of the encrypted media file requested by the client and an authorization license of the at least one encrypted media file that has the same content identifier and encryption information as those of the first encrypted media file, and the client controls use of the authorization license of the at least one encrypted media file.

For example, when the first encrypted media file is a media fragment file in a streaming media file, the at least one encrypted media file may be a streaming media fragment file that belongs to the same streaming media file as the first encrypted media file.

Therefore, when decrypting and playing the at least one encrypted media file, the client does not need to request an authorization license of another encrypted media file. This can improve authorization efficiency. In addition, if the at least one encrypted media file and the first encrypted media file have continuous playing locations, playing smoothness of the client can be further improved. In addition, time shift and playback functions of a media file are supported.

It should be noted that, in the foregoing second possible implementation, the formatted content protection data may include the content identifier and the encryption method information. Correspondingly, the DRM server may parse the content protection data packet to obtain the formatted content protection data, and determine the key information of the first encrypted media file based on the mapping relationship and the content identifier and the encryption method information in the formatted content protection data.

It should be further noted that, in the foregoing second possible implementation, the formatted content protection data may include the content identifier, the encryption method information, and at least one of the key identifier or the current playing location index of the first encrypted media file. Correspondingly, the DRM server may parse the content protection data to obtain the formatted content protection data; and determine the key information of the first encrypted media file based on the mapping relationship, the content identifier and the encryption method information in the formatted content protection data, and at least one of the key identifier or the current playing location index of the first encrypted media file.

In a third possible implementation, when the formatted content protection data in the content protection data packet includes the current playing location index field, the license in the first possible implementation may further carry key information of each of at least one adjacent encrypted media file whose location is continuous with the current playing location of the first encrypted media file. The license is further used to grant permission to play the at least one adjacent encrypted media file.

Correspondingly, the client may further decrypt each encrypted media file based on the key information of each of the at least one adjacent encrypted media file to obtain at least one adjacent media file, and play the at least one adjacent media file.

It should be noted that if the client requests an authorization license of an encrypted media file from the DRM server, the DRM server sends, to the client, both of the authorization license of the encrypted media file requested by the client and an authorization license of the at least one adjacent encrypted media file whose location is continuous with the current playing location of the first encrypted media file, and the client controls use of the authorization license of the another encrypted media file.

Therefore, when decrypting and playing the foregoing encrypted media files with the continuous playing locations, the client does not need to request the authorization license of the another encrypted media file. This can improve authorization efficiency and improve playing smoothness of the client. In addition, time shift and playback functions of a media file are supported.

Optionally, that the client decrypts the first encrypted media file based on the key information of the first encrypted media file specifically includes: parsing the content protection data packet to obtain the formatted content protection data; obtaining the first encryption method from the formatted content protection data; and decrypting the first encrypted media file based on the key information of the first encrypted media file and the first encryption method to obtain the first media file.

It should be noted that, in the foregoing three possible implementation, the first encrypted media file may be a streaming media file or a media fragment file in a streaming media file. When the first encrypted media file is a streaming media file, the first key may include a key of each media fragment file in the streaming media file and a key identifier of the key of each streaming media fragment file.

It should be further noted that the first encryption method may be a state cryptography algorithm. In other words, the DRM server supports encryption by using the state cryptography algorithm. The terminal can correctly parse the content protection data packet to obtain the state cryptography algorithm.

In a possible implementation, the license request includes a first content protection data packet field. The content protection data packet field is used to carry the content protection data packet.

In a possible implementation, the license includes a key information field. The key information field is used to carry the key information of the first encrypted media file.

Optionally, the key information field is further used to carry key information of another encrypted media file authorized by the DRM server.

Optionally, the license request further includes a permission type information field. The permission type information field is used to carry permission type information. The permission type information indicates at least one of online playing permission or offline playing permission.

Optionally, the license further includes a permission type information field. The permission type information field is used to carry permission type information. The permission type information indicates at least one of online playing permission or offline playing permission.

It should be noted that the permission type information field is extended in the license request and the license, so that offline playing can be authorized, and time shift and playback functions of offline playing are supported.

In a possible implementation, in the ChinaDRM standard, the license request is generated by using a CDRMC_GetLicenseRequest function, a pu8DrmInfo parameter in the CDRMC_GetLicenseRequest function includes a DRM information field and an extension field. The DRM information field is used to carry the content protection data packet. The extension field is used to carry the permission type indication information.

For example, an example of the CDRMC_GetLicenseRequest function is as follows:

```
int    CDRMC_GetLicenseRequest    (CDRMC_Session-
    Handle    hSession,    unsigned    char*pu8DrmInfo,
    unsigned    int    u32DrmInfoLen,    unsigned
    char*pu8LicenseRequest,    unsigned
    int*pu32LicenseRequestLen)
```

A format definition of the foregoing example is as follows:

(1) Function: a license obtaining request message (namely, the license request in this embodiment of this application).

(2) Parameters:

hSession: an input parameter and a DRM session handle;

pu8DrmInfo: an input parameter and DRM information, in a format of "[Base64 encoding of the content identifier or Base64 encoding of the pssh box] "extensions": [extensions data]", where [extensions data] is a definable field, and extended data may be stored in an Extension field of the license obtaining request message;

u32DrmInfoLen: an input parameter and a DRM information length;

pu8LicenseRequest: an output parameter and a license request data buffer; and pu32LicenseRequestLen: an input and output parameter, an input license request data buffer length, and an output license request data length.

(3) Return: int, 0 indicates success, and other values indicate failure.

(4) Description offline request: supports an offline license, where according to the ChinaDRM standard, {"keyType": "KEY_TYPE_OFFLINE" } may be extended in the Extension field in the license request message, and is placed into an authenticationData field after BASE64 encoding. An example is as follows:

"extensions":{"authenticationData":
    "eyJrZXUeXBIjoiSoVZX1RZUEVfToZGTElOR
    SJ9"}

For example, an example of a pu8DrmInfo field in the CDRMC_GetLicenseRequest function is as follows:

AAAA03Bzc2gAAAAAPV5tNZuaQei4Q908bnLEL-
    AAAAIN7InZIcnNpb24iOiJWMS4
    wIiwiY29udGVudElEIjoiTVRBdo1EQXhNRE-
    V5TXpRMU5qYzRPUTo9Iiwia2lkcyI6WyJOelpsT
    npSaU56YzBaREF4TkRSaU1XSXhPRE5tl-
    RnME1ERTRabVEzTVRrPSJdLCJlbnNjaGVtYSI6I
    mNIbmMifQ=="extensions":{"authenticationData":
    "eyJrZXMUeXBIjoiSoVZXiRZUEVfToZGTE
    lORSJ9"}"

Optionally, the method further includes: The client plays the first media file.

According to the DRM method provided in this embodiment of this application, an entire-process solution based on content protection data packets in a uniform format is provided for the DRM server and the DRM client. The DRM server and the DRM client that use the solution can implement an accurate and effective interworking operation. Further, because the formatted content protection data in the packaged data sent by the DRM server is obtained by performing the first formatting on the content protection data, after receiving the packaged data, the client may parse the packaged data to obtain the formatted content protection data based on the first formatting. Therefore, the DRM server and the client can transmit data in a uniform format to perform a DRM interworking operation.

In other words, in all DRM processes performed between the DRM server and the client, the pssh data and the pssh box in a uniform format are used. This can ensure that messages transmitted between the DRM server and the client have a uniform format, and both the DRM server and the client can correctly parse the messages in the uniform format and therefore can perform a proper DRM interworking operation.

The foregoing describes the DRM method 100 provided in this embodiment of this application with reference to FIG. 1. The following describes a DRM system to which the method 100 can be applied.

Figure 2:
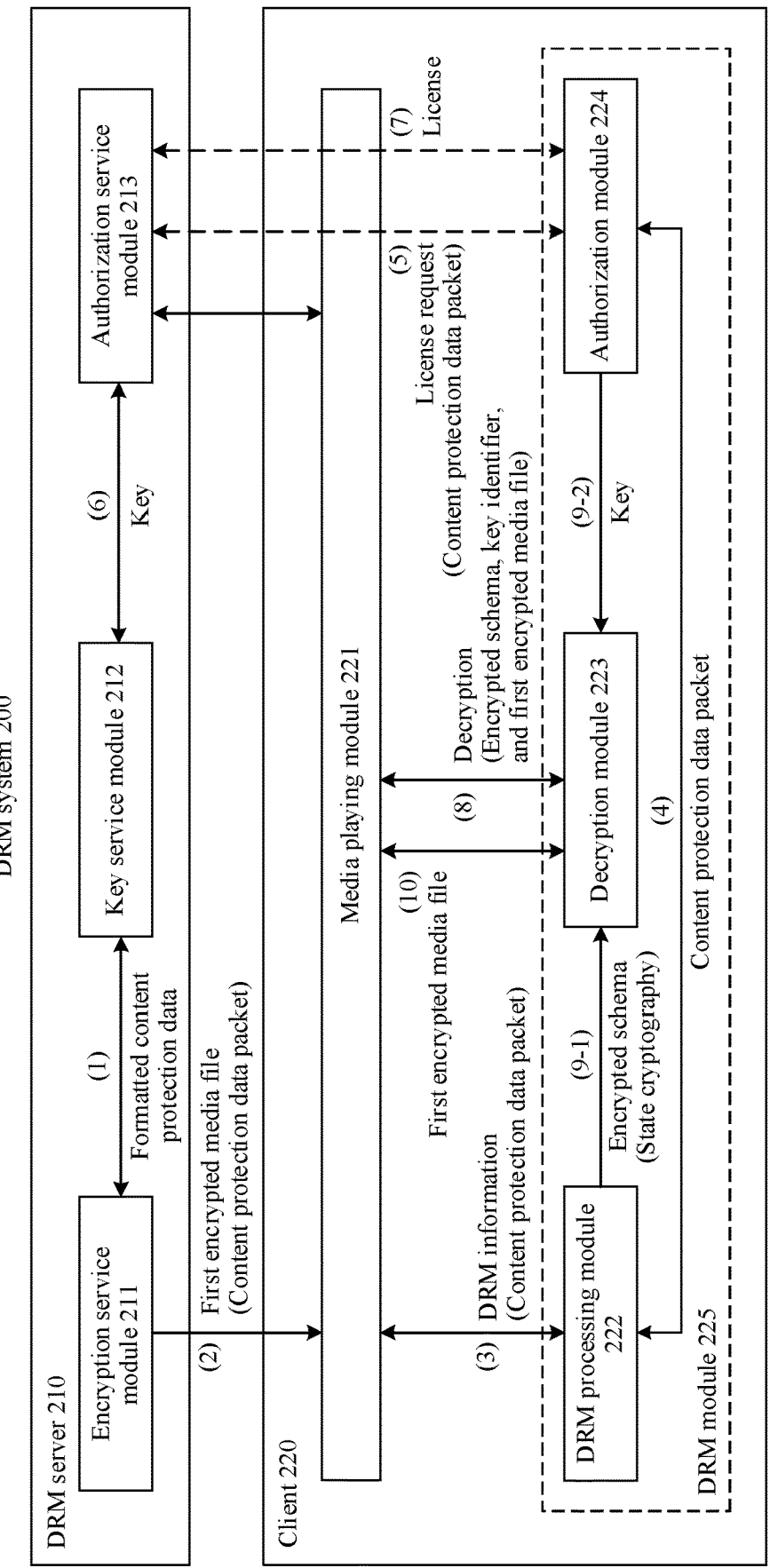
FIG. 2 is a schematic diagram of a DRM system 200 according to an embodiment of this application.

FIG. 2 is a DRM system 200 according to an embodiment of this application. As shown in FIG. 2, the DRM system 200 includes a DRM server 210 and a client 220. The DRM server 210 includes an encryption service module 211, a key service module 212, and an authorization service module 213. The client 220 includes a media playing module 221, a DRM processing module 222, a decryption module 223, and an authorization module 224.

It should be noted that the DRM processing module 222, the decryption module 223, and the authorization module 224 in the client 220 form a DRM module 225. The DRM module 225 and the media playing module 221 may be two independent apparatuses or integrated into one apparatus. This is not limited in this embodiment of this application.

It should be further noted that the foregoing apparatus may be understood as a virtual apparatus, and the foregoing integration may be logical integration.

For example, the media playing module 221 and the DRM module 225 are two independent applications.

For another example, the media playing module 221 and the DRM module 225 are different functional modules of one application.

It should be further noted that formatted content protection data in FIG. 2 may be understood as pssh data, and a content protection data packet may be understood as a pssh box.

The encryption service module 211 is configured to determine a first encryption method for a first media file.

The key service module 212 is configured to determine a first key for the first media file.

The encryption service module 211 or the key service module 212 is further configured to: encrypt the first media file by using the first encryption method to obtain a first encrypted media file; generate content protection description information of the first encrypted media file, where the content protection description information includes a content identifier and encryption method information, the content identifier identifies the first encrypted media file, and the encryption method information identifies the first encryption method; perform first formatting on the content protection description information to generate the formatted content protection data (the pssh data), as shown in step (1) in FIG. 2; and encapsulate the formatted content protection data to generate the content protection data packet (the pssh box).

In a possible implementation, the formatted content protection data includes a version number field, a content identifier field, an encrypted schema field, and at least one of a key identifier field, a current playing location index field, or an extension field.

It should be noted that, regardless of whether the encryption service module 211 or the key service module 212 performs the foregoing steps to generate the pssh data and the pssh box, both the encryption service module 211 and the key service module 212 need to synchronize the pssh data and the pssh box that are obtained in the process of performing the foregoing steps.

It should be further noted that, for the foregoing steps of generating the pssh data and the pssh box and related descriptions, refer to S110 to S140 in the method 100. To avoid repetition, details are not described herein again.

The key service module 212 is further configured to store a correspondence among the content identifier, the encryption method information, and key information of the first encrypted media file. The key information includes the first key and a key identifier of the first key. The key identifier identifies the key.

The encryption service module 211 is further configured to: package the content protection data packet and the first encrypted media file to obtain packaged data, and send the packaged data to the media playing module 221 of the client, as shown in step (2) in FIG. 2.

It should be noted that, for the foregoing step of packaging the pssh box and the first encrypted media file and related descriptions, refer to S150 in the method 100. To avoid repetition, details are not described herein again.

The media playing module 221 is configured to: receive the packaged data sent by the encryption service module 211, where the packaged data includes the content protection data packet and the first encrypted media file; obtain the content protection data packet from the packaged data; and send DRM information to the DRM processing module 222, where the DRM information includes the content protection data packet, as shown in step (3) in FIG. 2.

It should be noted that, for the foregoing step of obtaining the pssh box from the packaged data and related descriptions, refer to S160 in the method 100. To avoid repetition, details are not described herein again.

In a possible implementation, the DRM information includes a DRM information field. The DRM information field is used to carry the content protection data packet.

The DRM processing module 222 is configured to: receive the DRM information sent by the media playing module 221; and send the content protection data packet in the DRM information to the authorization module 224, as shown in step (4) in FIG. 2.

The authorization module 224 is configured to: receive the content protection data packet sent by the DRM processing module 222; and send a license request to the authorization service module 213 in the server 210, where the license request is used to request permission to play the first encrypted media file, and the license request message carries the content protection data packet, as shown in step (5) in FIG. 2.

It should be noted that, for the step of sending the license request to the authorization service module 213 by the authorization module 224, refer to introduction and descriptions related to the license request in the method 100. To avoid repetition, details are not described herein again.

The authorization service module 213 is configured to: receive the license request sent by the authorization module 224; determine the key information of the first encrypted media file based on the content protection data packet and a pre-stored mapping relationship, where the mapping relationship indicates the correspondence among the content identifier, the encryption method, and the key information; and send a license to the authorization module 224 in the client 220, where the license is used to grant permission to play the first encrypted media file, and the license carries the key information of the first encrypted media file, as shown in step (7) in FIG. 2.

In a possible implementation, because the key service module 212 stores a mapping relationship indicating the correspondence among the content identifier, the encryption method information, and the key information, the authorization service module 213 is specifically configured to: obtain the mapping relationship from the key service module 212, as shown in step (6) in FIG. 2; and determine the key information of the first encrypted media file based on the content protection data packet and the pre-stored mapping relationship.

It should be noted that, for the step of authorizing the license by the authorization service module 213 based on the license request sent by the authorization module 224, refer to introduction and descriptions related to license authorization in the method 100. To avoid repetition, details are not described herein again.

Optionally, step (5) may be replaced with the following path: the authorization module 224-the DRM processing module 222-the media playing module 221-the authorization service module 213; and step (7) may be replaced with the following path: the authorization service module 213-the media playing module 221-the DRM processing module 222-the authorization module 224.

The media playing module 221 is further configured to invoke a decryption interface of the DRM module 225, and send the first encrypted media file to the decryption module 223, as shown in step (8) in FIG. 2.

Optionally, when the formatted content protection data includes the key identifier of the first encrypted media file, the media playing module 221 is further configured to: parse the content protection data packet to obtain the formatted content protection data; obtain the key identifier of the first encrypted media file from the formatted content protection data; and invoke the decryption interface, and send the key identifier of the first encrypted media file to the decryption module 223, as shown in step (8) in FIG. 2.

Optionally, the media playing module 221 is further configured to: parse the content protection data packet to obtain the formatted content protection data; obtain the first encryption method from the formatted content protection data; and send the encryption method information to the decryption module 223 through the decryption interface, as shown in step (8) in FIG. 2.

The DRM processing module 222 is further configured to: parse the content protection data packet in the DRM information to obtain the formatted content protection data; obtain the first encryption method from the formatted content protection data; and send the encryption method information to the decryption module 223, as shown in step (9-1) in FIG. 2.

It should be noted that both the media playing module 221 and the DRM processing module 222 may parse the content protection data packet to obtain the encryption method information. However, in a conventional technology, the media playing module 221 cannot correctly parse a state cryptography algorithm. When the encryption method of the first encrypted media file is the state cryptography algorithm, the media playing module 221 cannot correctly parse the content protection data packet to obtain the state cryptography algorithm. Therefore, a priority of the encryption method information parsed by the DRM processing module 222 may be set to be higher than that of the encryption method information parsed by the media playing module 221. In this way, the client can support the state cryptography algorithm.

The decryption module 223 is configured to: receive the key identifier that is of the first encrypted media file and that is sent by the media playing module 221; request the key information of the first encrypted media file from the authorization module 224 based on the key identifier; and receive the key information that is of the first encrypted media file and that is sent by the authorization module 224, as shown in step (9-2) in FIG. 2.

It should be noted that when the license carries key information of a plurality of encrypted media files, the decryption module 223 may request the key information of the plurality of encrypted media files from the authorization module 224 at a time; or may request the key information of the plurality of encrypted media files from the authorization module 224 in batches, for example, request one piece of key information when using one piece of key information.

The decryption module 223 is further configured to: receive the first encrypted media file sent by the media playing module 221, as shown in step (8) in FIG. 2; receive the encryption method information sent by the DRM processing module 222 or the media playing module 221, as shown in step (9-1) in FIG. 2; receive the key information of the first encrypted media file sent by the authorization module 224, as shown in step (9-2) in FIG. 2; decrypt the first encrypted media file based on the key of the first encrypted media file and the encryption method information to obtain the first media file; and send the first media file to the media playing module 221, as shown in step (10) in FIG. 2.

The media playing module 221 is further configured to receive the first media file sent by the decryption module 223, and play the first media file.

The foregoing describes the DRM method 100 and the DRM system 200 provided in embodiments of this application with reference to FIG. 1 and FIG. 2. The following describes, with reference to FIG. 3 to FIG. 5, a DRM apparatus 300 configured to perform the foregoing method 100.

It should be noted that the DRM apparatus 300 may be the DRM server or the client in the embodiment of the method 100. This is not limited in this embodiment of this application.

It may be understood that, to implement the foregoing functions, the apparatus 300 includes a corresponding hardware and/or software module for performing each function. Algorithm steps in the examples described with reference to embodiments disclosed in this specification can be implemented by hardware or a combination of hardware and computer software in this application. Whether a function is executed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, functional modules of the apparatus 300 may be obtained through division according to the foregoing method examples. For example, the functional modules may be obtained through division corresponding to various functions, or two or more functions may be integrated into one processing module. The integrated module may be implemented in a form of hardware. It should be noted that, in embodiments, division into the modules is an example and is merely logical function division, and may be other division in an actual implementation.

Figure 3:
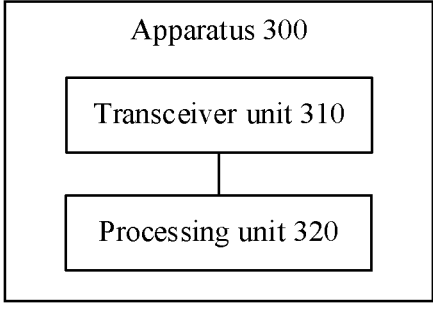
FIG. 3 is a schematic flowchart of a DRM apparatus 300 according to an embodiment of this application.

When each functional module is obtained through division corresponding to each function, FIG. 3 is a schematic diagram of a possible composition of the DRM server and the client in the foregoing embodiments. As shown in FIG. 3, the apparatus 300 may include a transceiver unit 310 and a processing unit 320.

The processing unit 320 may control the transceiver unit 310 to implement the method in the embodiment of the method 100, and/or another process of the technology described in this specification.

It should be noted that all related content of the steps in the foregoing method embodiments may be cited in function description of corresponding functional modules. Details are not described herein again.

The apparatus 300 provided in this embodiment is configured to perform the method 100. Therefore effects that are the same as those of the foregoing implementation method can be achieved.

In a possible implementation, the apparatus 300 is the DRM server. Correspondingly, the processing unit 310 may include the encryption service module 211, the key service module 212, and the authorization service module 213. In other words, the processing unit 310 is configured to implement functions corresponding to the encryption service module 211, the key service module 212, and the authorization service module 213.

In a possible implementation, the apparatus 300 is the client. Correspondingly, the processing unit 310 may include the media playing module 221, the DRM processing module 222, the decryption module 223, and the authorization module 224. In other words, the processing unit 310 is configured to implement functions corresponding to the media playing module 221, the DRM processing module 222, the decryption module 223, and the authorization module 224.

When an integrated unit is used, the apparatus 300 may include a processing unit, a storage unit, and a communication unit. The processing unit may be configured to control and manage an action of the apparatus 300, for example, may be configured to support the apparatus 300 in performing steps performed by the foregoing units. The storage unit may be configured to support the apparatus 300 in storing program code, data, and the like. The communication unit may be configured to support communication between the apparatus 300 and another device.

The processing unit may be a processor or a controller. The controller may implement or execute various example logical blocks, modules, and circuits described with reference to content disclosed in this application. The processor may alternatively be a combination, for example, a combination including one or more microprocessors or a combination of digital signal processor (digital signal processor, DSP) and a microprocessor, for implementing a computing function. The storage unit may be a memory. The communication unit may be specifically a device that communicates with another electronic device, for example, a radio frequency circuit, a Bluetooth chip, and a Wi-Fi chip.

Figure 4:
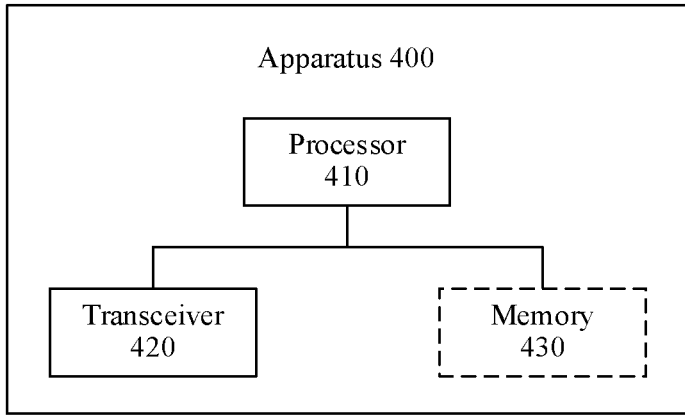
FIG. 4 is a schematic flowchart of a DRM apparatus 400 according to an embodiment of this application.

In a possible implementation, the apparatus 300 in this embodiment may be a DRM apparatus 400 having a structure shown in FIG. 4. The apparatus 400 may be a schematic diagram of a structure of a DRM server, or may be a schematic diagram of a structure of a client. The apparatus 400 includes a processor 410 and a transceiver 420. The processor 410 and the transceiver 420 communicate with each other through an internal connection path. A related function implemented by the processing unit 320 in FIG. 3 may be implemented by the processor 410. A related function implemented by the transceiver unit 310 may be implemented by the processor 410 by controlling the transceiver 420.

Optionally, the server 400 may further include a memory 430. The processor 410, the transceiver 420, and the memory 430 communicate with one another through an internal connection path. A related function implemented by the storage unit in FIG. 3 may be implemented by the memory 430.

In a possible implementation, when the client in the foregoing method 100 is deployed in a terminal, the apparatus 300 in this embodiment of this application may be the terminal.

Figure 5:
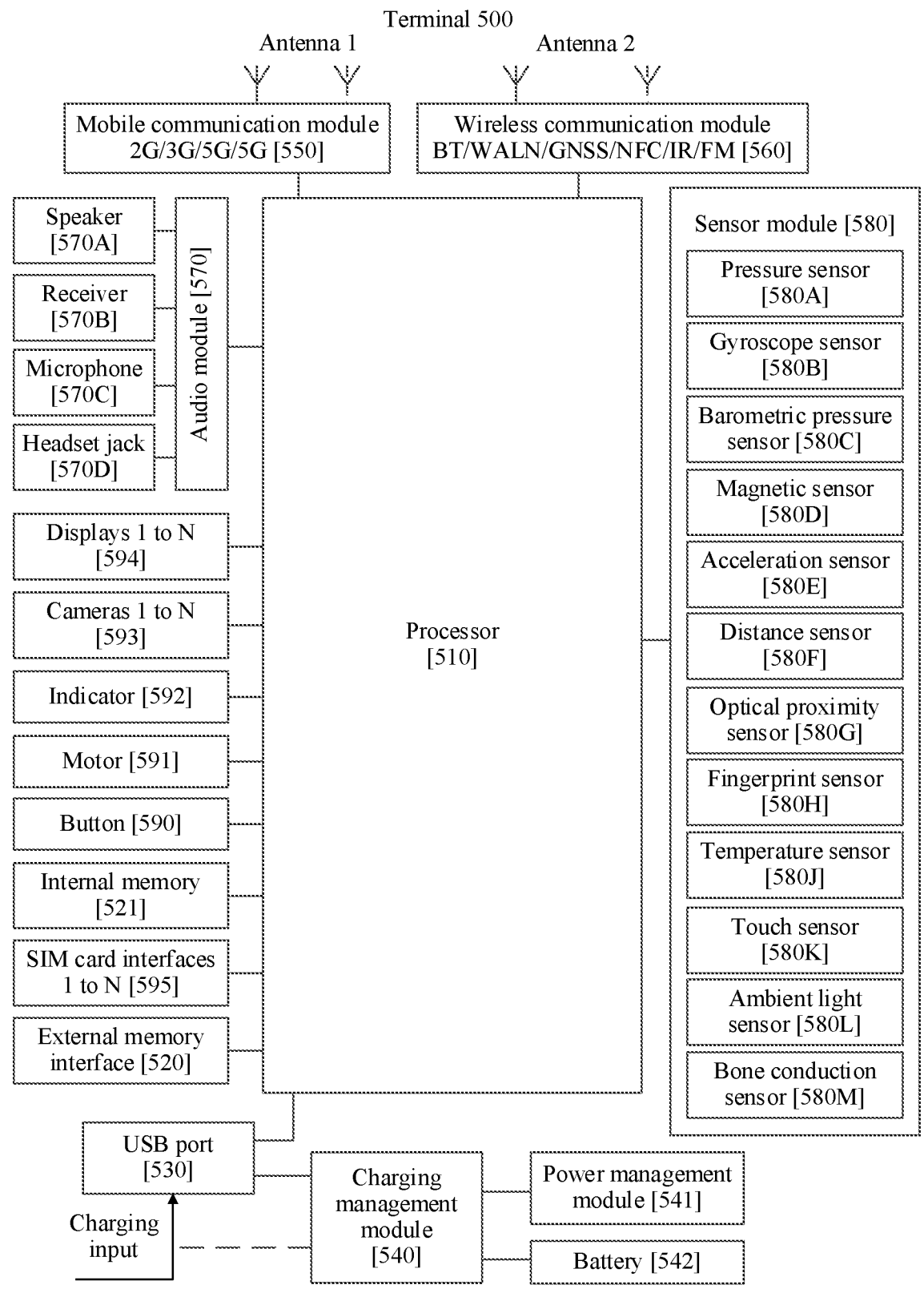
FIG. 5 is a schematic flowchart of a terminal 500 according to an embodiment of this application.

FIG. 5 is a schematic diagram of a structure of a terminal 500. As shown in FIG. 5, the terminal 500 may include a processor 510, an external memory interface 520, an internal memory 521, a universal serial bus (USB) interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a button 590, a motor 591, an indicator 592, a camera 593, a display 594, a subscriber identity module (SIM) card interface 595, and the like.

It may be understood that the structure shown in this embodiment of this application does not constitute a specific limitation on the terminal 500. In some other embodiments of this application, the terminal 500 may include more or fewer components than those shown in the figure, or some components may be combined, or some components may be split, or there may be a different component layout. The components shown in the figure may be implemented by hardware, software, or a combination of software and hardware.

The processor 510 may include one or more processing units. For example, the processor 510 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the terminal 500 may alternatively include one or more processors 510. The controller may generate an operation control signal based on instruction operation code and a time sequence signal, to complete control of instruction fetching and instruction execution. In some other embodiments, a memory may further be disposed in the processor 510, to store instructions and data. For example, the memory in the processor 510 may be a cache. The memory may store instructions or data just used or cyclically used by the processor 510. If the processor 510 needs to use the instructions or the data again, the processor 510 may directly invoke the instructions or the data from the memory. In this way, repeated access is avoided, waiting time of the processor 510 is reduced, and efficiency of processing data or executing instructions by the terminal 500 is improved.

In some embodiments, the processor 510 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB port, and/or the like. The USB port 530 is a port that conforms to a USB standard specification, and may be specifically a mini USB port, a micro USB port, a USB Type-C port, or the like. The USB port 530 may be configured to connect to a charger to charge the terminal 500, or may be configured to transmit data between the terminal 500 and a peripheral device. The USB port 530 may alternatively be configured to connect to a headset, and play audio by using the headset.

It may be understood that an interface connection relationship between the modules in this embodiment of this application is merely an example for description, and does not constitute a limitation on the structure of the terminal 500. In some other embodiments of this application, the terminal 500 may alternatively use an interface connection manner different from that in the foregoing embodiment, or may use a combination of a plurality of interface connection manners.

The charging management module 540 is configured to receive a charging input from a charger. The charger may be a wireless charger or a wired charger. In some embodiments of wired charging, the charging management module 540 may receive a charging input of a wired charger through the USB port 530. In some embodiments of wireless charging, the charging management module 540 may receive a wireless charging input through a wireless charging coil of the terminal 500. The charging management module 540 may further supply power to the terminal by using the power management module 541 while charging the battery 542.

The power management module 541 is configured to connect to the battery 542, the charging management module 540, and the processor 510. The power management module 541 receives an input of the battery 542 and/or the charging management module 540, and supplies power to the processor 510, the internal memory 521, an external memory, the display 594, the camera 593, the wireless communication module 560, and the like. The power management module 541 may be further configured to monitor parameters such as a battery capacity, a battery cycle count, and a battery health status (electric leakage or impedance). In some other embodiments, the power management module 541 may alternatively be disposed in the processor 510. In some other embodiments, the power management module

541 and the charging management module 540 may alternatively be disposed in a same device.

A wireless communication function of the terminal 500 may be implemented through the antenna 1, the antenna 2, the mobile communication module 550, the wireless communication module 560, the modem processor, the baseband processor, and the like.

The antenna 1 and the antenna 2 are configured to transmit and receive an electromagnetic wave signal. Each antenna in the terminal 500 may be configured to cover one or more communication frequency bands. Different antennas may be further multiplexed, to improve antenna utilization. For example, the antenna 5 may be multiplexed as a diversity antenna of a wireless local area network. In some other embodiments, the antenna may be used in combination with a tuning switch.

The mobile communication module 550 may provide a solution that is applied to the terminal 500 and that includes wireless communication such as 2G, 3G, 4G, 5G, and the like. The mobile communication module 550 may include at least one filter, a switch, a power amplifier, a low noise amplifier (low noise amplifier, LNA), and the like. The mobile communication module 550 may receive an electromagnetic wave through the antenna 1, perform processing such as filtering or amplification on the received electromagnetic wave, and transmit a processed electromagnetic wave to the modem processor for demodulation. The mobile communication module 550 may further amplify a signal modulated by the modem processor, and convert the signal into an electromagnetic wave for radiation through the antenna 5. In some embodiments, at least some functional modules in the mobile communication module 550 may be disposed in the processor 510. In some embodiments, at least some functional modules in the mobile communication module 550 and at least some modules in the processor 510 may be disposed in a same device.

The wireless communication module 560 may provide a solution, applied to the terminal 500, to wireless communication including a wireless local area network (WLAN) (for example, a wireless fidelity (Wi-Fi) network), Bluetooth (Bluetooth, BT), a global navigation satellite system (GNSS), frequency modulation (FM), a near field communication (NFC) technology, an infrared (IR) technology, and the like.

Optionally, the wireless communication module 560 may be one or more components integrating at least one communication processing module. One communication processing module may correspond to one network interface. The network interface may be disposed in different service function modes. Network interfaces disposed in different modes may establish network connections corresponding to the modes.

For example, a network connection supporting a P2P function may be established by using a network interface in a P2P function mode. A network connection supporting an STA function may be established by using a network interface in an STA function mode. A network connection supporting an AP function may be established by using a network interface in an AP mode.

The wireless communication module 560 receives an electromagnetic wave through the antenna 2, performs frequency modulation and filtering processing on an electromagnetic wave signal, and sends a processed signal to the processor 510. The wireless communication module 560 may further receive a to-be-sent signal from the processor 510, perform frequency modulation and amplification on the signal, and convert the signal into an electromagnetic wave for radiation through the antenna 2.

The terminal 500 implements a display function by using the GPU, the display 594, the application processor, and the like. The GPU is a microprocessor for image processing, and is connected to the display 594 and the application processor. The GPU is configured to perform mathematical and geometric computation, and render an image. The processor 510 may include one or more GPUs that execute program instructions to generate or change display information.

The display 594 is configured to display an image, a video, or the like. The display 594 includes a display panel. The display panel may use a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), and the like. In some embodiments, the terminal 500 may include one or more displays 594.

In some embodiments of this application, when the display panel is made of a material such as an OLED, an AMOLED, or an FLED, the display 594 in FIG. 5 may be folded. Herein, that the display 594 may be folded means that the display may be folded to any angle at any part and may be maintained at the angle. For example, the display 594 may be folded left and right in the middle, or may be folded up and down in the middle. In this application, the display that can be folded is referred to as a foldable display. The touch display may be a display, or may be a display formed by combining a plurality of displays. This is not limited herein.

The display 594 of the terminal 500 may be a flexible display. Currently, the flexible display attracts much attention because of unique features and huge potential of the flexible display. Compared with a conventional display, the flexible display has features of strong flexibility and bendability, and can provide a user with a new bendability-based interaction mode, to satisfy more requirements of the user on a terminal. For a terminal equipped with a foldable display, the foldable display of the terminal may be switched between a small display in a folded form and a large display in an unfolded form at any time. Therefore, the user uses a multi-screen display function more frequently on the terminal equipped with the foldable display.

The terminal 500 may implement a photographing function through the ISP, the camera 593, the video codec, the GPU, the display 594, the application processor, and the like.

The ISP is configured to process data fed back by the camera 593. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 593.

The camera 593 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 500 may include one or more cameras 593.

The digital signal processor is configured to process a digital signal, and may process another digital signal in addition to the digital image signal. For example, when the terminal 500 selects a frequency, the digital signal processor is configured to perform Fourier transform and the like on frequency energy.

The video codec is configured to compress or decompress a digital video. The terminal 500 may support one or more video codecs. In this way, the terminal 500 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information based on a structure of a biological neural network, for example, a transfer service function between human brain neurons, and may further continuously perform self-learning. The NPU can implement applications such as intelligent cognition of the terminal 500, for example, image recognition, facial recognition, speech recognition, and text understanding.

The external memory interface 520 may be configured to connect to an external storage card, for example, a micro SD card, to extend a storage capability of the terminal 500. The external storage card communicates with the processor 510 through the external memory interface 520, to implement a data storage function. For example, files such as music and videos are stored in the external storage card.

The internal memory 521 may be configured to store one or more computer programs. The one or more computer programs include instructions. The processor 510 may run the instructions stored in the internal memory 521, so that the terminal 500 performs a screen-off display method provided in some embodiments of this application, various applications, data processing, and the like. The internal memory 521 may include a program storage area and a data storage area. The program storage area may store an operating system. The program storage area may further store one or more applications (such as gallery and contacts), and the like. The data storage area may store data (for example, photos and contacts) created during use of the terminal 500, and the like. In addition, the internal memory 521 may include a high-speed random access memory, or may include a nonvolatile memory, for example, one or more magnetic disk storage devices, a flash memory device, or a universal flash storage (UFS). In some embodiments, the processor 510 may run the instructions stored in the internal memory 521 and/or the instructions stored in the memory that is disposed in the processor 510, so that the terminal 500 performs the screen-off display method provided in embodiments of this application, other applications, and data processing. The terminal 500 may implement an audio function, for example, music playing and recording, through the audio module 570, the speaker 570A, the receiver 570B, the microphone 570C, the headset jack 570D, the application processor, and the like.

The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, a bone conduction sensor 580M, and the like.

An embodiment further provides a computer storage medium. The computer storage medium stores computer instructions. When the computer instructions are run on an electronic device, the electronic device is enabled to perform the foregoing related method steps, to implement the DRM method in the foregoing embodiments.

An embodiment further provides a computer program product. When the computer program product runs on a computer, the computer is enabled to perform the foregoing related steps, to implement the DRM method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the DRM method in the foregoing method embodiments.

The server, the terminal, the computer storage medium, the computer program product, or the chip provided in embodiments is configured to perform the corresponding method provided above. Therefore, for beneficial effects that can be achieved by the server, the terminal, the computer storage medium, the computer program product, or the chip, refer to the beneficial effects in the corresponding method provided above. Details are not described herein again.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

encrypting, by a digital rights management (DRM) server, a first media file using a first encryption method, to obtain a first encrypted media file;

generating, by the DRM server, content protection description information of the first encrypted media file, wherein the content protection description information comprises a content identifier and encryption method information, the content identifier identifies the first encrypted media file, the encryption method information identifies the first encryption method, wherein the first encryption method comprises sm4c or sm4s, and wherein the sm4c represents SM4-CBC sample encryption, and the sm4s represents SM4-CBC subsample encryption;

performing, by the DRM server, first formatting on the content protection description information to generate formatted content protection data, wherein the first formatting is javascript object notation (JSON) formatting, the content protection description information is in a first format that is other than a JSON format, and a data content of the formatted content protection data and a data content of the content protection description information is the same data content, wherein the formatted content protection data comprises a content identifier field and an encrypted schema field, the content identifier field carries the content identifier, and the encrypted schema field carries the encryption method information, and wherein the formatted content protection data further comprises a version number field, an extension field, a key identifier field, and a current playing location index field, wherein the version number field indicates a version number of the formatted content protection data, the extension field carries extension data, the key identifier field indicates an identifier of a first key, the first key is a key for encrypting the first media file, and the current playing location index field indicates a current playing location of the first encrypted media file;

encapsulating, by the DRM server, the formatted content protection data to generate a content protection data packet, wherein the content protection data packet comprises a formatted data field and a data size field, the formatted data field carries the formatted content protection data, and the data size field indicates a size of the formatted data field;

packaging, by the DRM server, the content protection data packet and the first encrypted media file, and sending to a client, and receiving, by the DRM server, a license request sent by the client, wherein the license request requests permission to play the first encrypted media file, and the license request carries the content protection data packet.

2. The method according to claim 1, further comprising:

determining, by the DRM server, key information of the first encrypted media file based on the content protection data packet and a pre-stored mapping relationship, wherein the key information comprises the first key and the identifier of the first key, and the mapping relationship indicates a correspondence among the content identifier, the first encryption method, and the key information; and sending, by the DRM server, a license to the client, wherein the license is usable to grant permission to play the first encrypted media file, and the license carries the key information of the first encrypted media file.

3. The method according to claim 2, further comprising:

parsing, by the DRM server, the content protection data packet to obtain the current playing location;

determining, by the DRM server based on the current playing location, key information of at least one adjacent encrypted media file whose location is continuous with the current playing location of the first encrypted media file, wherein the key information of the at least one adjacent encrypted media file comprises a key of each encrypted media file of the at least one adjacent encrypted media file and a key identifier of each adjacent encrypted media file; and sending, by the DRM server, the license to the client, wherein the license further carries key information of each encrypted media file of the at least one adjacent encrypted media file, and the license is further usable to grant permission to play the at least one adjacent encrypted media file.

4. The method according to claim 2, wherein the license request further comprises a permission type information field, the permission type information field carries permission type information, and the permission type information indicates at least one of online playing permission or offline playing permission.

5. The method according to claim 1, wherein packaging, by the DRM server, the content protection data packet and the first encrypted media file, and sending to the client comprises:

adding, by the DRM server, the content protection data packet to a media description file of the first encrypted media file; or adding, by the DRM server, the content protection data packet to an unencrypted field, wherein the first encrypted media file comprises the unencrypted field.

6. The method according to claim 1, wherein packaging, by the DRM server, the content protection data packet and the first encrypted media file, and sending to the client comprises:

adding, by the DRM server, the content protection data packet to a media presentation description (MPD) file of the first encrypted media file when the first encrypted media file meets a dynamic adaptive streaming over HTTP (DASH) standard;

adding, by the DRM server, the content protection data packet to an M3U8 file of the first encrypted media file when the first encrypted media file meets an HTTP live streaming (HLS) standard or a common media application format (CMAF) standard; or adding, by the DRM server, the content protection data packet to an unencrypted field of the first encrypted media file when a format of the first encrypted media file is a moving picture experts group (MP4) format or a fragmented moving picture experts group (FMP4) format.

7. The method according to claim 1, wherein the formatted content protection data is protection system specific header data having the JSON format.

8. The method according to claim 1, wherein the content protection data packet is a protection system specific header data box.

9. The method according to claim 1, wherein in the formatted content protection data the content identifier is a first JSON key/value and the encryption method information is a second JSON key/value.

10. The method according to claim 1, wherein packaging, by the DRM server, the content protection data packet and the first encrypted media file, and sending to the client comprises:

adding, by the DRM server, the content protection data packet to a media description file of the first encrypted media file.

11. The method according to claim 1, wherein packaging, by the DRM server, the content protection data packet and the first encrypted media file, and sending to the client comprises:

adding, by the DRM server, the content protection data packet to a media presentation description (MPD) file of the first encrypted media file when the first encrypted media file meets a dynamic adaptive streaming over HTTP (DASH) standard.

12. A method, comprising:

receiving, by a client, packaged data sent by a digital rights management (DRM) server, wherein the packaged data comprises a content protection data packet and a first encrypted media file, formatted content protection data is encapsulated in the content protection data packet, the formatted content protection data is obtained by performing first formatting on content protection description information of the first encrypted media file, wherein the first formatting is javascript object notation (JSON) formatting, the content protection description information comprises a content identifier and encryption method information, the content identifier identifies the first encrypted media file, and the encryption method information identifies a first encryption method used to encrypt a first media file corresponding to the first encrypted media file, and wherein the first encryption method comprises sm4c or sm4s, wherein the sm4c represents SM4-CBC sample encryption, and the sm4s represents SM4-CBC sub-sample encryption, wherein the formatted content protection data comprises a content identifier field and an encrypted schema field, the content identifier field carries the content identifier, and the encrypted schema field carries the encryption method information, and wherein the formatted content protection data further comprises a version number field, an extension field, a key identifier field, and a current playing location index field, wherein the version number field indicates a version number of the formatted content protection data, the extension field carries extension data, the key identifier field indicates an identifier of a first key, the first key is a key for encrypting the first media file, and the current playing location index field indicates a current playing location of the first encrypted media file;

obtaining, by the client, the content protection data packet from the packaged data, wherein the content protection data packet comprises a formatted data field and a data size field, the formatted data field carries the formatted content protection data, and the data size field indicates a size of the formatted data field;

decrypting, by the client, the first encrypted media file based on the content protection data packet, to obtain the first media file; and sending, by the client, a license request to the DRM server, wherein the license request requests permission to play the first encrypted media file, and the license request carries the content protection data packet.

13. The method according to claim 12, further comprising:

receiving, from the DRM server, a license granting permission to play the first encrypted media file, wherein the license carries key information of the first encrypted media file, the key information of the first encrypted media file is determined based on the content protection data packet and a pre-stored mapping relationship, wherein the key information of the first encrypted media file comprises the first key and the identifier of the first key, and the mapping relationship indicates a correspondence among the content identifier, the first encryption method, and the key information of the first encrypted media file, and wherein the license further carries key information of each encrypted media file of at least one adjacent encrypted media file whose location is continuous with the current playing location of the first encrypted media file, and the license further grants permission to play the at least one adjacent encrypted media file, and wherein the key information of the at least one adjacent encrypted media file comprises a key of each encrypted media file of the at least one adjacent encrypted media file and a key identifier of each adjacent encrypted media file.

14. A digital rights management (DRM) server, comprising:

at least one processor; and a non-transitory computer readable storage medium storing a program that is executable by the at least one processor, the program including instructions for:

encrypting a first media file using a first encryption method, to obtain a first encrypted media file;

generating content protection description information of the first encrypted media file, wherein the content protection description information comprises a content identifier and encryption method information, the content identifier identifies the first encrypted media file, the encryption method information identifies the first encryption method, and wherein the first encryption method comprises sm4c or sm4s, wherein the sm4c represents SM4-CBC sample encryption, and the sm4s represents SM4-CBC subsample encryption;

performing first formatting on the content protection description information to generate formatted content protection data, wherein the first formatting is javascript object notation (JSON) formatting, the content protection description information is in a first format that is other than a JSON format, and a data content of the formatted content protection data and a data content of the content protection description information is the same data content, and wherein the formatted content protection data comprises a content identifier field and an encrypted schema field, the content identifier field carries the content identifier, and the encrypted schema field carries the encryption method information, and wherein the formatted content protection data further comprises a version number field, an extension field, a key identifier field, and a current playing location index field, wherein the version number field indicates a version number of the formatted content protection data, the extension field carries extension data, the key identifier field indicates an identifier of a first key, the first key is a key for encrypting the first media file, and the current playing location index field indicates a current playing location of the first encrypted media file;

encapsulating the formatted content protection data to generate a content protection data packet, wherein the content protection data packet comprises a formatted data field and a data size field, the formatted data field carries the formatted content protection data, and the data size field indicates a size of the formatted data field;

packaging the content protection data packet and the first encrypted media file, and sending to a client, and receiving a license request sent by the client, wherein the license request requests permission to play the first encrypted media file, and the license request carries the content protection data packet.

15. The DRM server according to claim 14, wherein the program further includes instructions for:

determining key information of the first encrypted media file based on the content protection data packet and a pre-stored mapping relationship, wherein the key information of the first encrypted media file comprises the first key and the identifier of the first key, and the mapping relationship indicates a correspondence among the content identifier, the first encryption method, and the key information of the first encrypted media file;

parsing the content protection data packet to obtain the current playing location; and determining, based on the current playing location, key information of at least one adjacent encrypted media file whose location is continuous with the current playing location of the first encrypted media file, wherein the key information of the at least one adjacent encrypted media file comprises a key of each encrypted media file of the at least one adjacent encrypted media file and a key identifier of each adjacent encrypted media file; and sending a license to the client, wherein the license is usable to grant permission to play the first encrypted media file, and the license carries the key information of the first encrypted media file, and wherein the license further carries key information of each encrypted media file of the at least one adjacent encrypted media file, and the license is further usable to grant permission to play the at least one adjacent encrypted media file.

16. The DRM server according to claim 14, wherein the formatted content protection data is protection system specific header data having the JSON format.

17. The DRM server according to claim 14, wherein the content protection data packet is a protection system specific header data box.

18. The DRM server according to claim 14, wherein in the formatted content protection data the content identifier is a first JSON key/value and the encryption method information is a second JSON key/value.

19. The DRM server according to claim 14, wherein the license request further comprises a permission type information field, the permission type information field carries permission type information, and the permission type information indicates at least one of online playing permission or offline playing permission.

\*    \*    \*    \*    \*